(12) United States Patent
Rozenberg

(10) Patent No.: US 8,755,632 B2
(45) Date of Patent: Jun. 17, 2014

(54) METHODS AND SYSTEMS FOR CREATING AN ALIGNED BANK OF IMAGES WITH AN ITERATIVE SELF-CORRECTION TECHNIQUE FOR COORDINATE ACQUISITION AND OBJECT DETECTION

(75) Inventor: Yoav Rozenberg, Jerusalem (IL)

(73) Assignee: Pro Track Ltd., Jerusalem (IL)

( * ) Notice: Subject to any disclaimer, the term of this patent is extended or adjusted under 35 U.S.C. 154(b) by 1078 days.

(21) Appl. No.: 12/548,495

(22) Filed: Aug. 27, 2009

(65) Prior Publication Data

US 2010/0054627 A1 Mar. 4, 2010

(30) Foreign Application Priority Data

Sep. 4, 2008 (IL) .......................................... 193906

(51) Int. Cl.
*G06K 9/36* (2006.01)
(52) U.S. Cl.
USPC ............ 382/284; 382/154; 382/294; 345/634
(58) Field of Classification Search
USPC ............................ 382/284, 154, 294; 345/634
See application file for complete search history.

(56) References Cited

U.S. PATENT DOCUMENTS

| | | | | |
|---|---|---|---|---|
| 7,831,089 B2 * | 11/2010 | Ofek et al. | ..................... | 382/154 |
| 2005/0031197 A1 * | 2/2005 | Knopp | .......................... | 382/154 |
| 2008/0192125 A1 * | 8/2008 | Kang et al. | ................. | 348/222.1 |

* cited by examiner

*Primary Examiner* — Kim Vu
*Assistant Examiner* — Michael Vanchy, Jr.
(74) *Attorney, Agent, or Firm* — The Law Office of Michael E. Kondoudis

(57) ABSTRACT

Methods and systems for providing an aligned bank of images (e.g. for a panoramic display obtained by a scanning or moving camera) are disclosed that allow updating of the bank of images as new images are obtained; display of the original images stored in the bank as a mosaic according to any desired zoom; determination and display of the best mosaic view for a desired zoom; recall of the original images from the bank; and production of a mosaic that is free of accumulated stitching errors without imposing limitations on the way the camera scans. The methods and systems herein disclosed further have the ability to anchor the bank of images to the actual ground coordinates. The key to the method is inclusion of an iterative self-correcting procedure that reduces the accumulated errors as new images are added to the bank.

6 Claims, 16 Drawing Sheets

7a

7b

METHODS AND SYSTEMS FOR CREATING AN ALIGNED BANK OF IMAGES WITH AN ITERATIVE SELF-CORRECTION TECHNIQUE FOR COORDINATE ACQUISITION AND OBJECT DETECTION

FIELD OF THE INVENTION

This invention generally relates to methods for creating properly aligned image mosaics, and more specifically to methods and systems for creating such mosaics and using them for ground coordinate acquisition of any point on an image and for object detection in the image.

BACKGROUND OF THE INVENTION

For many applications involving the use of a camera, there is a need for a tool to inform the user of the camera's orientation. An important example of a case where such a tool is needed is when a camera is used to create a mosaic of images covering a wide area where the ground coordinates of every point on the mosaic must be acquired quickly and accurately.

Many applications exist for building panoramic images. Some applications work offline, that is, the mosaic is created after all of the images are taken. This type of method is not always applicable, however, as the mosaic frequently must be created on-line from a live video source, and needs to be updated in real time as the video camera moves. In an online application of this type, the video can theoretically continue forever.

Some applications do allow online creation of a panoramic view from multiple individual photographs or video captures. These applications are usually based on image matching algorithms that compute a matching transformation between two images. FIG. 7 illustrates schematically such a procedure, in which matching transformation $T_{1,2}$ computes the match between images $I_1$ and $I_2$ (FIG. 7a), in particular point $P_2$ of image $I_2$ corresponding to point $P_1$ of image $I_1$ (FIG. 7b). The accuracy of such algorithms is limited, and certain patterns of camera motion can lead to large errors in the image location as matching errors are accumulated. FIG. 2 illustrates such a case. The accumulated matching error between the first image acquired (20) and the final image acquired (29) can be very large as the composite error is due to errors arising from 10 separate image matching operations.

The possibilities of overcoming this problem are limited, as the mosaic created by the image matching procedure preserves neither the original images from the video nor their associated transformations.

There is thus a long-felt need for a tool that has the following characteristics: (1) it is capable of storing all of the original images collected for the creation of the mosaic in a bank that allows an online mosaic display of these images, and which enables updating of the bank of images and the mosaic display as new images are obtained; (2) the original images stored in the bank can be displayed as a mosaic according to any desired zoom; (3) if many images cover the same area, the images with the proper zoom can be selected for inclusion in the mosaic display, thus allowing the best mosaic view according to the selected zoom; (4) it should always be possible to recall from the bank and to view the original images covering any part of the mosaic; and (5) the mosaic produced by the tool should be free of accumulated stitching errors, yet imposing no limitation on the way the camera is scanning (as in FIG. 2).

Furthermore, for maximum utility, any tool with the above characteristics needs to be able to anchor the images in the bank to the ground in order to provide a rapid and simple way to obtain the ground coordinates of any point in the displayed mosaic or in any of the original images from which the mosaic was formed.

Specifically, when the source of images is a video stream, there is a special need to anchor the last video frame, so that the user can know where the camera is pointing at any given moment. The user can then retrieve the ground coordinates of any point of interest in the video frame.

Several systems exist for ground anchoring of aerial photos. The common method is to allow the user to mark manually several pairs of "tie points." The first point in the pair is a point on the photo; the second point is marked on a map or orthophoto. A global ground to image transformation is computed, and using this transformation, every ground point can be converted to image point and vice versa. Some systems can create the tie-points automatically. One common way to do it is to use an image to ground matching algorithm (IGA), usually based on matching the current photo to an already anchored photo, usually an orthophoto (FIG. 9). However, good performance by IGAs is not easy to achieve. They frequently fail, especially when trying to match images taken from significantly different view angles, and are in general not sufficiently reliable to be able to provide acceptable results for video anchoring.

Many systems for ground anchoring of aerial photos are generally adapted for offline work. After the photos are taken, the anchoring procedure can be performed either manually or automatically. These systems, however, are not built for anchoring a continuously growing bank of images or mosaic. Specifically, they cannot provide a means for automatically anchoring the last video frame.

SUMMARY OF THE INVENTION

The system and method disclosed in this patent are specifically designed to overcome these difficulties. This system allows incremental buildup of an image bank in which the images are anchored to ground. The method further compensates for the poor performance of the image to ground matching algorithm (IGA) by using the information about connection between the images in the bank and by introducing a special iterative self-correction technique to reduce accumulated errors.

The methods introduced in this patent are designed to provide a new process for creating an aligned bank of images via an iterative self-correction technique, for anchoring the bank to ground, for detecting objects in the images and for creating a mosaic display of the images in the bank collected up to the time of reaction of the mosaic. The source of the images is an optical imaging device (e.g. a camera or video camera) which scans in an unconstrained pattern the area surrounding it or part thereof (e.g. scanning a landscape). Each newly obtained image is stored in an image bank along with additional information about the image's orientation. The bank is continuously updated as new images are added.

Two types of aligned bank of images are introduced. The first type (A-Bank) is adapted for the case of a camera at a fixed position that can rotate or change zoom. Each new image is matched to images already in the bank using an image matching algorithm (IM). The bank keeps the images together with their absolute transformation A, e.g. the transformation between each image and a predefined fixed image. Reference is now made to FIG. 1, in which such a procedure is illustrated schematically for a bank of images 100. A series of absolute transformations 1001, 1002, and 1003 transform predefined fixed image 10 to images 11, 12, and 13, respectively. When the newly obtained image overlaps more than one image, an iterative self-correction procedure introduced here is used to reduce the errors of the absolute transformation of some images already in the bank (FIGS. 2, 3). This special technique ensures the low error rate of matching errors in the bank.

At any time, a ground anchoring of A-BANK procedure can be performed either manually or automatically to anchor the A-BANK to the ground so that the ground coordinates of every image point can be easily computed. Images added to the bank after performing the anchoring procedure will be anchored as well. Specifically, the image most recently entered into the bank is anchored to the ground, allowing real-time online video-to-ground anchoring of the object(s) being viewed by the camera, e.g., a landscape.

A second bank type, G-BANK, is used in the case of a moving camera. The bank retains the images along with their ground to image transformation G. This type of bank is illustrated schematically in FIG. 4, in which ground to image transformations 4000 and 4001 are associated with images provided from camera positions 40 and 41, respectively. Each new image is transferred to an image to ground matching algorithm (IGA) and the ground to image transformation G is computed. If the procedure fails, G is approximated by matching the new image to other images already in the bank. With a G-BANK, there is no need to perform the type of anchoring procedure used with an A-BANK because the bank is created and incremented while the image is anchored to ground. Specifically, the ground to image transformation of the image most recently entered into the bank is computed, allowing real-time online video-to-ground anchoring of the object(s) being viewed by the camera, e.g., a landscape.

When the newly obtained image is successfully matched to ground by the IGA algorithm or when it overlaps more than one image, an iterative self-correction procedure for the G-BANK is used to reduce the errors of the ground to image transformation of images already in the bank (FIGS. 4, 5). This special technique ensures a low rate of matching errors.

The advantage of use of a G-BANK is clear, as it obviates the need for performing an anchoring procedure. Nevertheless, the advantage of the A-BANK is that it can be created and incremented without using an IGA, an algorithm that normally requires use of a Digital Elevation Model (DEM) that may not always be available. If needed, the bank can be anchored to ground at any time.

The aligned image bank described in this patent can be used for object detection in images obtained by a rotating or a moving camera. Object detection algorithms usually obtain a base image and an additional list of reference images overlapping the base image. The algorithm obtains the relative transformation between each reference image and the base image as well (FIG. 13) and returns a list of detected objects locations on the base image, optionally, with additional information such as object size and velocity (in image coordinates). A special case of object detection is a moving object detection algorithm. As the original images are retained in the bank and the transformation of each image is known, an aligned image bank described herein allows detection of moving objects in a live video of a moving or rotating camera, including cases in which the zoom is changing.

Furthermore, detected objects can be displayed on the mosaic view of the bank, and in the case of a G-BANK or an anchored A-BANK, ground coordinates of said objects can be computed and displayed on their appropriate location on a map. Ground anchoring can be further used to transform detected object size and velocity in image coordinates to the real velocity and size in ground coordinates.

Another advantage of using the aligned image bank for object detection involves the use of regions of parameters for detection. Many object detection algorithms allow the definition of regions on the base image, each region with its appropriate set of parameters for detection. This way, one region can be defined for sensitive detection while other region can be totally excluded from detection (FIG. 14). In the case of a fixed camera, the user can define the regions on the video image of the camera. However, when the camera is moving or rotating to cover a wide area, there is no simple way known in the prior art for a user to define the regions. Using the mosaic view of the aligned bank introduced herein provides a solution to the problem. The user can define the regions on the mosaic view of the bank. This is a simple and intuitive process for the user. The regions' projections onto the base image for detection are then computed and transferred to the object detection algorithm.

A further advantage is achieved in the case of a G-BANK or an anchored A-BANK. It is possible to define said regions on a map with ground coordinates rather than defining them on the mosaic view, giving the user a better alternative to define the regions. The regions' projections onto the base image for detection are then computed and transferred to the object detection algorithm.

It is therefore an object of the invention disclosed herein to provide a method for creating an aligned bank of images from an image sequence source comprising the steps of: (a) obtaining an image sequence source (ISS) in which images are captured from a fixed location; (b) creating a bank adapted for (i) storage of images; and, (ii) storage of additional data for every image, said additional data comprising at least (i) an absolute transformation adapted to transform a point in said image to a corresponding location on a predefined fixed reference image; and (ii) the quality value of said transformation; (c) capturing a first image from said ISS; (d) storing said first image with a fixed predefined absolute transformation and quality value; (e) capturing a new image from said ISS; (f) computing said new image's absolute transformation by matching said new image to at least one overlapping image within said bank; (g) storing said new image, its absolute transformation and its quality value in the said bank; (h) performing an iterative self-correcting procedure by altering the absolute transformation of a set of images within said bank if said new image overlaps at least two previously captured images within said bank, thereby improving the quality value of said transformation; and, (i) repeating steps (e)-(h) for each new image. It is within the essence of the invention wherein an aligned bank of images is created that contains substantially all of the information in said images along with additional information comprising at least an absolute transformation and further wherein said quality values of said images stored within said aligned bank of images are reduced by using an iterative self-correction procedure.

It is a further object of the invention to provide a method as defined above, wherein said method further comprises the additional step of displaying at least two stored images as a mosaic by aligning the displayed images using the images' transformation matrix according to a predetermined algorithm.

It is a further object of the invention to provide a method as defined above, wherein said method further comprises the additional step of using a Ground Anchoring of A-BANK (GAAB) algorithm to anchor said bank to the ground.

It is a further object of the invention to provide a method as defined above, wherein said method further comprises the additional steps of (a) selecting any point from any image in said bank; and (b) calculating the ground coordinates of said point using a Ground Coordinates Extraction of an Anchored A-BANK (GCEAAB) algorithm. It is within the essence of the invention wherein the geographic coordinates of a pixel of any image in said aligned bank of images is extracted via an iterative self-correction procedure.

It is a further object of the invention to provide a method as defined above, wherein said method further comprises the additional steps of (a) anchoring said bank to the ground by a GAAB algorithm; (b) selecting any point of any image in said mosaic view of said bank; and (c) using a GCEAAB algorithm to calculate the ground coordinates said point. It is within the essence of the invention wherein the geographic coordinates of said pixel in said mosaic view of said aligned bank of images is extracted.

It is a further object of the invention to provide a method as defined above, wherein said method further comprises the additional steps of (a) obtaining an ISS adapted for producing a temporal sequence of images; (b) updating the aligned bank of images with new images from said ISS; and (c) calculating the ground coordinates of any point in the most recently inserted image by using a GCEAAB algorithm.

It is a further object of the invention to provide a method as defined above, wherein said method further comprises the additional steps of (a) defining a number N of regions to be used (N=integer≥0); (b) defining said regions in reference to a data set chosen from the group consisting of (i) images within said bank and (ii) said mosaic view created from images within said bank; (c) defining a set of detection parameters for each of said regions; (d) selecting a base image for object detection from said bank; (e) projecting said list of regions onto said base images by using a predetermined algorithm; (f) retrieving from said bank a list of reference images overlapping said base image; (g) applying the absolute transformation of said base image and said reference images, thereby computing a relative transformation between each of said reference images and said base image; and, (h) applying an object detection algorithm to said base image, said list of regions, said list of reference images, said relative transformations and said detection parameters, thereby obtaining a list of detected objects. It is within the essence of the invention wherein said method uses said aligned bank of images with said iterative self-correction procedure in order to detect an object.

It is a further object of the invention to provide a method as defined above, wherein said method further comprises the additional step of using the images' transformation to compute the location of said detected object within said mosaic view of said bank.

It is a further object of the invention to provide a method as defined above, wherein said claim further comprises the additional steps of (a) defining a number N of regions to be used (N=integer≥0); (b) defining said regions in reference to a data set chosen from the group consisting of (i) images in said bank, (ii) the mosaic view within said bank, and (iii) ground coordinates; (c) defining a set of detection parameters for each of said regions; (d) selecting a base image for object detection from said bank; (e) projecting said list of regions onto said base image by using a predetermined algorithm; (f) retrieving a list of reference images overlapping said base image from said bank; (g) applying the absolute transformation of said base image and said reference images, thereby computing a relative transformation between each of said reference images and said base image; (h) applying an object detection algorithm to said base image, said list of regions, said list of reference images, said relative transformations and said detection parameters, thereby obtaining a list of detected objects; (i) updating the said bank with M new images (M=integer≥0); and (j) repeating steps (d)-(i) until a "stop" command is received. It is within the essence of the invention wherein said method detects an object by using said aligned bank of images that contains substantially all of the information in said images along with additional information comprising at least an absolute transformation and further wherein the said quality values of said images within said aligned bank of images are reduced by using an interactive self-correction procedure.

It is a further object of the invention to provide a method as defined above, wherein said method further comprises the additional step of using a GCEAAB algorithm in order to compute the ground coordinates of each of said detected objects.

It is a further object of the invention to provide a method for creating a geographically anchored bank of images from an image sequence source, comprising the steps of: (a) obtaining an image source sequence (ISS) whereas said images are taken from a plurality of locations; (b) creating a bank adapted for (i) storage of images and (ii) storage of additional data for each image in said bank, said additional data comprising at least (i) a ground to image transformation adapted to transform three-dimensional coordinates to corresponding image coordinates; and (ii) the quality value of said transformation; (c) capturing a new image $I_0$ from said ISS; (d) attempting to calculate a ground to image transformation by applying an image to ground anchoring algorithm to said new image $I_0$; (e) repeating steps (c) and (d) until a ground to image transformation has been calculated successfully; (f) adding said new image $I_0$ and the computed ground to image transformation of $I_0$ to said bank; (g) capturing a new image $I_n$ from said ISS; (h) attempting to calculate a ground to image transformation by applying an image to ground anchoring algorithm to said new image $I_n$; (i) calculating a ground to image transformation if said ground to image transformation is not known for new image $I_n$ by matching said new image $I_n$ to at least one overlapping image already in said bank; (j) adding said new image In and the computed ground to image transformation of In to said bank; (k) performing an iterative self-correction procedure, thereby improving the quality value of the transformations of said images in said set, said procedure comprising the step of altering said ground to image transformation of a set of images within said bank if at least one of the following conditions is met: (1) said new image overlaps at least two previously captured video frames within said bank, (2) a ground to image transformation of said new image was successfully computed by said image to ground anchoring algorithm; and (l) repeating steps (g)-(k) until a "stop" command is received. It is within the essence of the invention wherein an aligned image bank that contains substantially all of the information in said images along with additional information comprising at least a ground to image transformation is created and further wherein said quality values of said images contained within said bank are reduced by use of an interactive self-correction procedure.

It is a further object of the invention to provide a method as defined above, wherein said method further comprises the additional step of extracting the geographic coordinates of a pixel in any image in said bank by applying a ground intersection algorithm (GIA).

It is a further object of the invention to provide a method as defined above, wherein said method further comprises the additional step of creating a virtual view of said observed landscape from any point of view desired by the operator by using a virtual view engine to apply said image to ground transformation matrices of said stored images.

It is a further object of the invention to provide a method as defined above, wherein said method further comprises the additional steps of (a) selecting a point from any image in said bank in said virtual view; and, (b) calculating the ground coordinates of said point by applying a GIA. It is within the essence of the invention wherein said method uses said geographically anchored bank of images to extract the geographic coordinates of any selected pixel in said virtual view.

It is a further object of the invention to provide a method as defined above, wherein said method further comprises the additional steps of (a) obtaining an ISS adapted for producing a temporal sequence of images; (b) updating the aligned bank of images with new images from said ISS; and, (c) calculating the ground coordinates of any point in the most recently inserted image by using a GIA algorithm.

It is a further object of the invention to provide a method as defined above, wherein said method further comprises the additional steps of (a) choosing a number N of regions (N=integer≥0); (b) defining said N regions with respect to a data set chosen from the group consisting of (i) a set of images within said bank, (ii) said virtual view of said bank and (iii) ground coordinates; (c) defining a set of detection parameters for each of said N regions; (d) selecting a base image for object detection from said bank; (e) projecting said list of regions on said base image by using a predetermined algorithm; (f) retrieving from said bank a list of reference images overlapping said base image; (g) applying the ground to image transformation of said base image and said reference images, thereby computing a relative transformation between each of said reference images and said base image; (h) applying an object detection algorithm to said base image, said list of regions, said list of reference images, said relative transformations and said detection parameters, thereby obtaining a list of detected objects; (i) updating the said bank with M new images (M=integer≥0); and (j) repeating steps (d)-(i) until a "stop" command is received. It is within the essence of the invention wherein said method uses said geographically anchored aligned bank of images to detect an object.

It is a further object of this invention to provide a system for producing an aligned bank of images, said system comprising: (a) a CSDI; (b) means for producing an ISS from images captured by said CSDI; and (c) software means for producing an aligned bank of images from said ISS according to the method as defined above. It is within the essence of the invention wherein said system uses an iterative self-correction procedure for producing said aligned bank of images from said ISS and further wherein substantially all of the information contained in said images along with additional information comprising at least an absolute transformation is retained in said aligned bank of images.

It is a further object of this invention to provide a system for producing an aligned bank of images, said system comprising: (a) a CSDI adapted for capturing images from a plurality of locations; (b) means for producing an ISS from images captured by said CSDI; and (c) software means for producing a geographically anchored bank of images from said ISS according to the method as defined above. It is within the essence of the invention wherein said system uses an iterative self-correction procedure for producing said geographically anchored bank of images from said ISS comprising images captured from a plurality of locations and further wherein substantially all of the information contained in said images along with additional information comprising at least an absolute transformation is retained in said aligned bank of images.

DETAILED DESCRIPTION OF THE INVENTION

Figure 1:
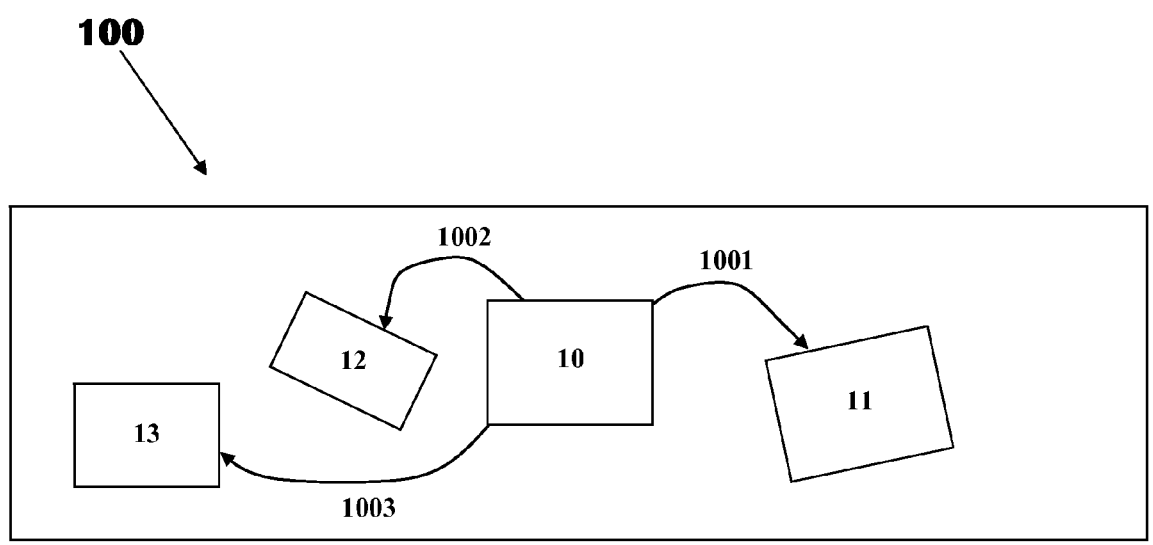
FIG. 1 illustrates schematically an A-BANK: an aligned bank of images storing images together with their absolute transformation relative to a predefined fixed image.

It will be apparent to one skilled in the art that there are several embodiments of the invention that differ in details of construction, without affecting the essential nature thereof, and therefore the invention is not limited by that which is illustrated in the figures and described in the specification, but only as indicated in the accompanying claims, with the proper scope determined only by the broadest interpretation of said claims.

As used herein, the term "digitized image" refers to any two-dimensional array that is intended to represent something (e.g., an object or a landscape) that exists in (three-dimensional) space. Similarly, as used herein, the term "capturing and storing a digitized image" (CSDI) refers to any means for producing a digitized image as defined above from a real object, scene, landscape, etc. ("capturing") and transferring it to any kind of digital storage medium ("storing").

Further, as used herein, the term "image sequence source" (ISS) refers to any means for providing a sequence of images obtained by CSDI from which a sequence of images can be extracted.

In the specific embodiments described in detail, the digitized images are photographs or video captures produced by a camera, video camera, etc., using visible light. These embodiments are provided by way of non-limiting example only, however, as it will be clear to one skilled in the art that the basic principles disclosed herein can be applied to any series of digitized images as defined above, by any means for CSDI. It is acknowledged and emphasized, however, that the method disclosed herein is completely general, and can be applied to any means of CSDI. For example, the method can be used for visual images produced under light of any frequency (IR, UV, radio, etc.) by any means used to produce such images (e.g. cameras such as IR, UV, and X-ray cameras, video cameras, radar, sonar, thermal sensors, etc.). Thus the use of expressions such as "camera" or "video camera" refer generically to means for producing CSDI as defined above and not to limit it to cameras and video cameras adapted for producing images under visible light or to other means for producing CSDI, even those that are not typically called "cameras" in colloquial parlance. While, in the specific embodiments described in detail, the ISS is a sequence of images captured in real-time from a video camera or a sequence of video images captured from a file containing a bank of stored images that have been previously captured from a video camera, these examples are given to illustrate the best modes contemplated for the invention are not in any sense intended to limit it to the specific embodiments described.

As used herein, the term "relative transformation between two images" refers to any linear transformation $T_{12}$ that, given two images $I_1$ and $I_2$, computes the location $P_2$ within image $I_2$ that is equivalent to an arbitrary point $P_1$ within the image $I_1$. One form of this transformation, which will be used hereinafter, is the affine transformation (well-known in the prior art) having the form $$P_2 = T_{12} \cdot P_1$$

where $P_1=(x_1, y_1, 1)$ is a point in the first image, $P_2=(x_2, y_2, 1)$ is a point in the second image, and the affine relative transformation $$T_{12} \begin{vmatrix} a_{00} & a_{01} & a_{02} \\ a_{10} & a_{11} & a_{12} \\ 0 & 0 & 1 \end{vmatrix}$$

As used herein, the term "absolute transformation of an image" refers to the transformation $A_i$ between a fixed predefined image $I_n$ and an arbitrary image $I_i$ defined by:

$$A_i = T_{n,i}$$

The absolute transformation of an image gives the position and orientation of any image in the bank relative to one fixed image.

Figure 7:
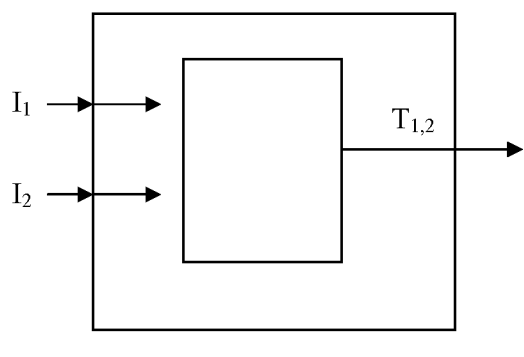
FIG. 7 illustrates schematically a schematic system implementing an image matching algorithm (IM).
Figure 7:
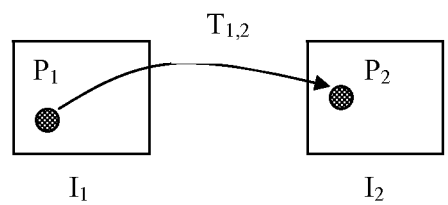

As used herein, the term "image matching algorithm" (IM) refers to any algorithm that takes two overlapping images $I_1$ and $I_2$ and calculates the relative transformation $T_{1,2}$ between them such that $T_{1,2}=IM(I_1, I_2)$. Reference is now made to FIG. 7a, which illustrates schematically an image matching algorithm (IM) for computing $T_{1,2}=IM(I_1, I_2)$.

As used herein, the term "image selection algorithm" (ISA) refers to any algorithm that obtains an arbitrary image $I_x$ with its transformation $A_x$, where $A_x$ can be either an absolute transformation or a ground to image transformation, and selects from the image bank a list $L=ISA(I_x, A_x)$ of candidate images $I_i$, each one with an associated transformation $A_i$, such that $$L=\{(I_1,A_1),(I_2,A_2),\ldots(I_n,A_n)\}$$

where each image $I_i$ in the list can be matched successfully to the image $I_x$ using the image matching algorithm IM.

As used herein, the term "Digital Elevation Model" (DEM) refers to any model that describes the elevation z of any ground coordinate (x,y) such that z=DEM(x,y). In the present invention, the DEM implemented is of a type well known in the art, namely, a simple grid model in which the z value is given for every coordinate $(x_i,y_i)$ in which $x_i$ or $y_i$ or both is a multiple of a fixed number N (usually 25 meters). As implemented in the present invention, DEM(X,Y) is computed using a bilinear interpolation of the four nearest neighbors of (X,Y) on the grid.

As used herein, the term "ground to image transformation" refers to any transformation G that transforms every point P on the ground to its matching location Q in the image such that Q=G(P). In the present invention, the ground to image transformation implemented is of a type based on those well-known in the art: G is a 4×4 matrix G that represents a projective transformation having the form $$P' = G \cdot P$$

where $P=(x_1, y_1, z_1, 1)$ are the ground coordinates, $P'=(x', y', z', 1)$, and $$G = \begin{vmatrix} a_{00} & a_{01} & a_{02} & a_{03} \\ a_{10} & a_{11} & a_{12} & a_{13} \\ a_{20} & a_{21} & a_{22} & a_{23} \\ 0 & 0 & 0 & 1 \end{vmatrix}$$

The transformed point P" on the image is given by $$P'' = \left(\frac{x'}{z'}, \frac{y'}{z'}\right)$$

As used herein, the term "relative transformation computation algorithm" (RTC) refers to any algorithm that obtains the ground to image transformation $G_1$, $G_2$ of two images $I_1$, $I_2$ and computes an approximate relative transformation $T_{12}=RTC(G_1, G_2)$ between the images.

As used herein, the term "virtual view" refers to a simulated view created from an image, which represents a view that would have been obtained had the image been taken from a different viewpoint.

Figure 8:
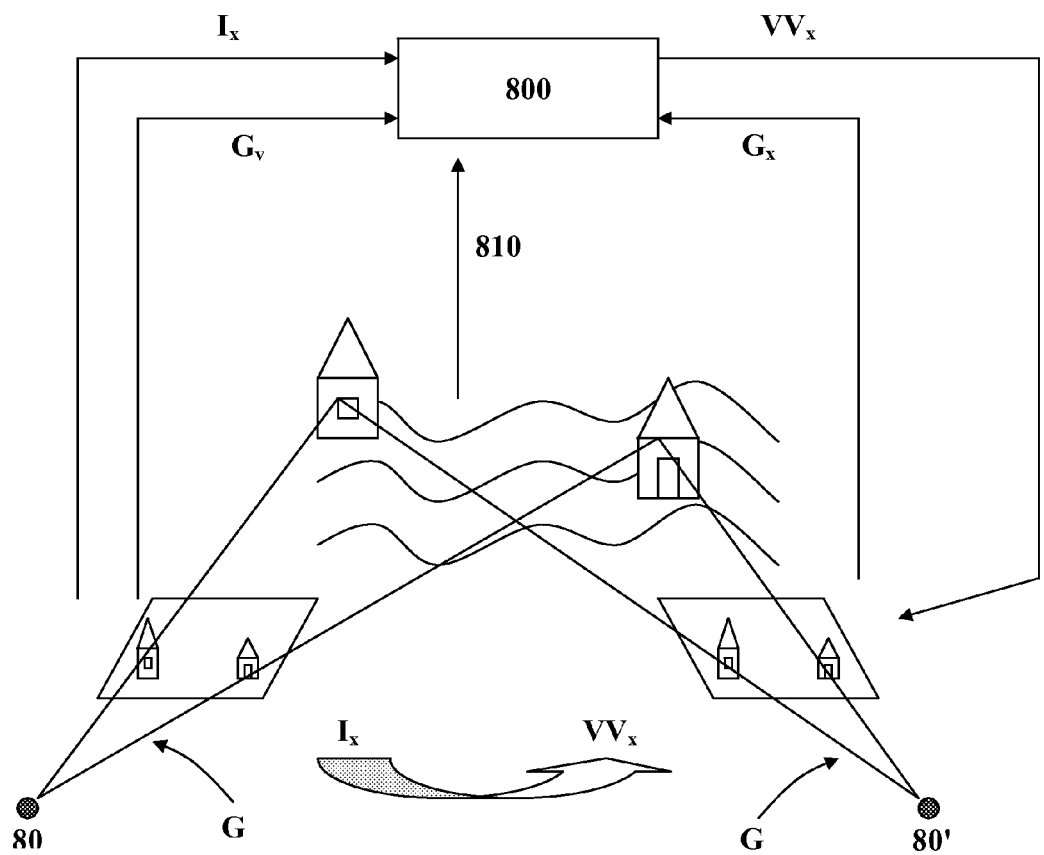
FIG. 8 illustrates schematically a typical virtual view engine (VVE) and a geometrical interpretation of the process.

As used herein, the term "virtual view engine" (VVE) refers to an algorithm that creates a virtual view from an existing image. Reference is made to FIG. 8, which illustrates a typical VVE 800. A DEM (810) of the terrain is used, and a virtual view $VV_x$ defined with a ground to image transformation $G_V$ of the desired view V obtained from camera position 80. A virtual view (from virtual camera position 80') is created for the source image $I_x$ having an image to image transformation $G_x$, such that $VV_x=VVE(G_V, I_x, G_x)$.

Figure 9:
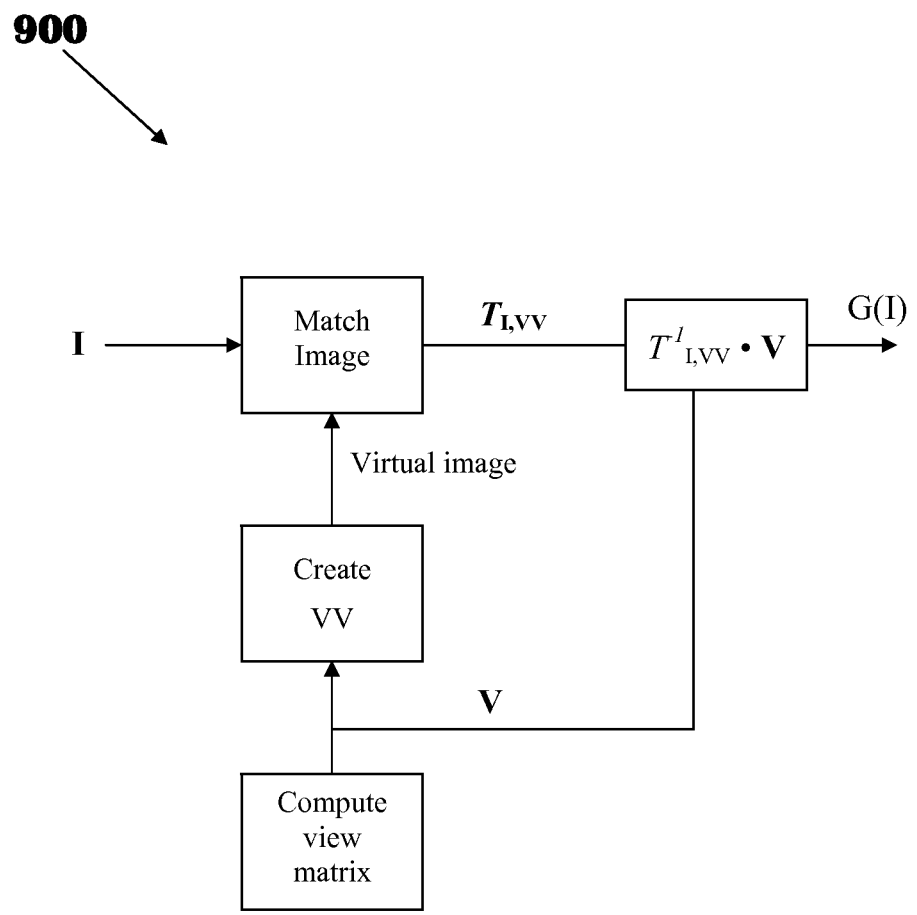
FIG. 9 illustrates schematically a typical system implementing an image to ground anchoring algorithm (IGA).

As used herein, the term "image to ground anchoring algorithm" (IGA) refers to any algorithm that obtains an arbitrary input image I and calculates the ground to image transformation G of the image I. Reference is made to FIG. 9, illustrating a typical IGA algorithm 900. It is assumed that the algorithm has access to a database of images of the area of interest that are anchored to the ground (i.e. the ground to image transformations of these images are known). Usually, an orthophoto (anchored air photos rectified as orthogonal photo) is used. This algorithm obtains the image and the camera ground coordinates. As implemented in typical embodiments of the invention herein disclosed, the IGA additionally obtains the approximate pan/tilt/yaw/zoom of the imaging device. According to these values, a projective view matrix V is computed and a virtual view of the image database is created according to the matrix V using a VVE. The transformation $T_{I,VV}$ between the input image I and the virtual view VV is computed by matching the image to the virtual view by using the image matching algorithm (IM). The final image to ground transformation is $G=T^1_{I,VV} \cdot V$.

Typical IGA algorithms frequently fail to match successfully the real and virtual views. The main reason is that the virtual view can severely differ from the input image. Thus, ideally, the IGA algorithm should notify the operator of its success or failure. In the invention herein disclosed, a manual version of the IGA algorithm enables a user to provide the ground coordinates $P_i$ of at least two points $Q_i$ in the image; a list L of these pairs is then created such that $L=\{(Q_1, P_1), (Q_2, P_2), \ldots\}$. The image to ground transformation is further computed using a ground to image matrix solving algorithm.

As used herein, the term "ground to image matrix solving algorithm" (GISA) refers to any algorithm that obtains the camera location C of the image I and a list L of at least two elements such that $L=\{(q_1, p_1), (q_2, p_2) \ldots\}$, in which $q_i$ is a point on image I and $p_i$ is the matching ground coordinate. The algorithm computes the transformation $G_I$=GISA(C,L) where $G_I$ is the ground to image transformation of the image I. In a typical implementation of the GIA as used in the invention herein disclosed, G is represented as a ground to image transformation matrix and is computed as follows.

G can be written as:

$$G = A \cdot T$$

where $$T = \begin{vmatrix} 1 & 0 & 0 & -C_x \\ 0 & 1 & 0 & -C_y \\ 0 & 0 & 1 & -C_z \\ 0 & 0 & 0 & 1 \end{vmatrix}$$

($C_x$, $C_y$, $C_z$ are the camera ground coordinates) and the unknown matrix $$A = \begin{vmatrix} a_{00} & a_{01} & a_{02} & 0 \\ a_{10} & a_{11} & a_{12} & 0 \\ a_{20} & a_{21} & a_{22} & 0 \\ 0 & 0 & 0 & 1 \end{vmatrix}$$

Figure 10:
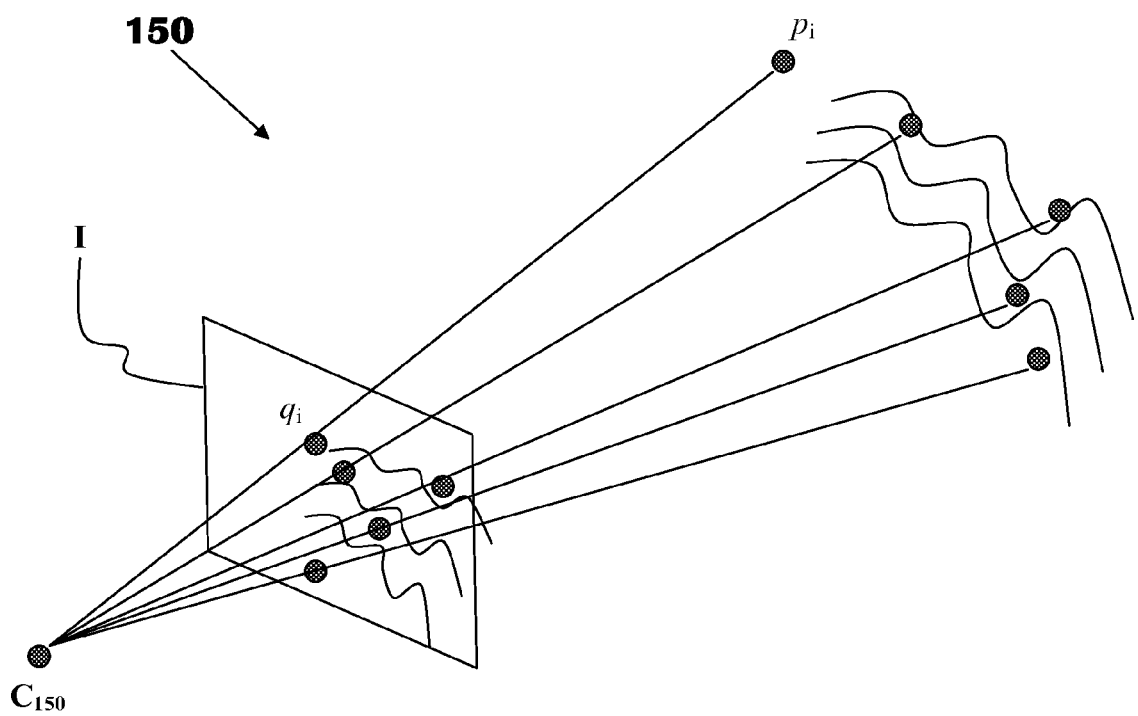
FIG. 10 illustrates schematically a geometric interpretation of a ground to image matrix solving algorithm (GISA).

With a list L of at least five elements, the matrix A can be solved with any linear equation solving technique known in the art, such as SVD. Reference is now made to FIG. 10, which provides a schematic illustration of a GISA (150) for an image I obtained from camera position $C_{150}$.

As used herein, the term "ground intersection algorithm" (GIA) refers to any algorithm that obtains an arbitrary input image I with its ground to image transformation matrix G and computes the corresponding ground coordinate $P=(p_x, p_y, p_z)$ of any point $Q=(q_x, q_y)$ on the image I such that $P=GIA(G, Q)$.

Figure 11:
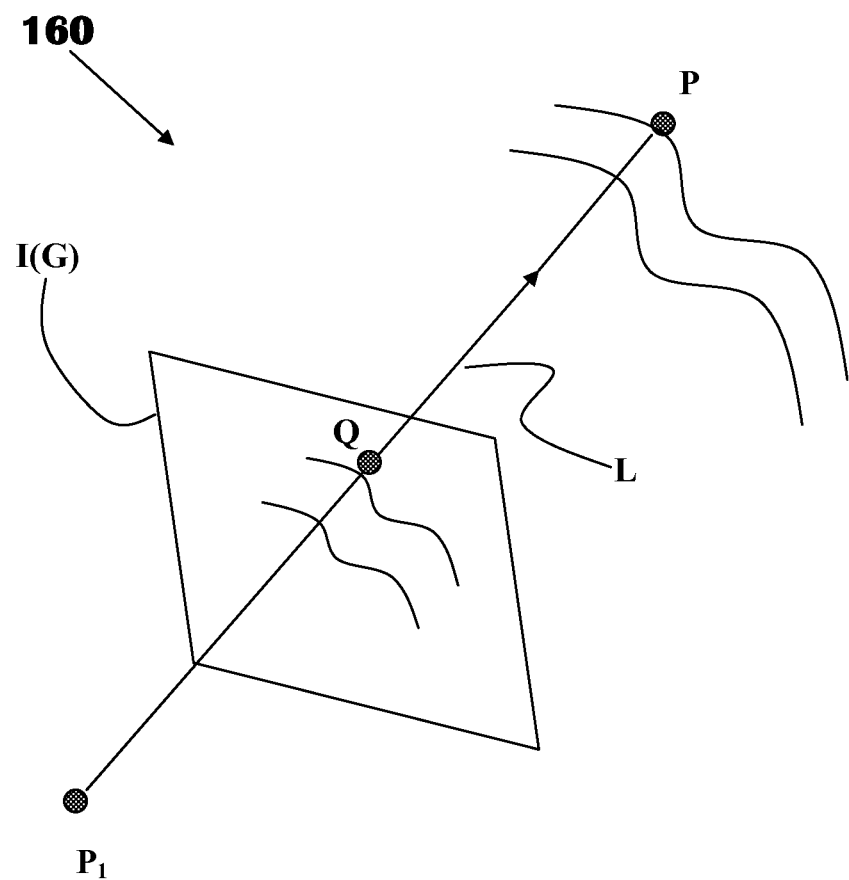
FIG. 11 illustrates a geometric interpretation of a ground intersection algorithm (GIA), computing the ground coordinates of a particular point in the image given the ground to image transformation and a digital elevation model (DEM).

A typical implementation of the GIA as used in the invention herein disclosed begins with calculation of the inverse $G^{-1}$ of a given ground to image transformation G. The ground coordinate P is computed using the ground digital elevation model (DEM) according to the following procedure. A line L is computed, starting at the point $P_1 = G^{-1} \cdot Q_1$ and passing through the point $P_2 = G^{-1} \cdot Q_2$ where $Q_1 = (0, 0, 0, 1)$ and $Q_2 = (q_x, q_y, 1, 1)$. The ground coordinate P is found by searching along the line L with a predefined step size, starting at point $P_1$ and stopping at the point P(x,y,z,1) when $p_z \leq DEM(p_x, p_y)$. A schematic illustration of the computation is illustrated in FIG. 11 for a typical implementation of the GIA 160 for an arbitrary image I(G).

As used herein, the term "aligned bank of images" refers to a bank able to store images with additional data including a transformation and a quality value of said transformation. Two types of aligned bank of images are A-BANK and G-BANK. In an A-Bank, for every image $I_i$ in the bank, the additional data includes at least an absolute transformation $A_i$, where $A_i$ is the relative transformation between a fixed predefined image and the image $I_i$. Reference is now made to FIG. 1, which illustrates an A-Bank storing a set of images together with the associated absolute transformation. In a typical implementation, the predefined fixed image is the first image added to the bank.

Figure 4:
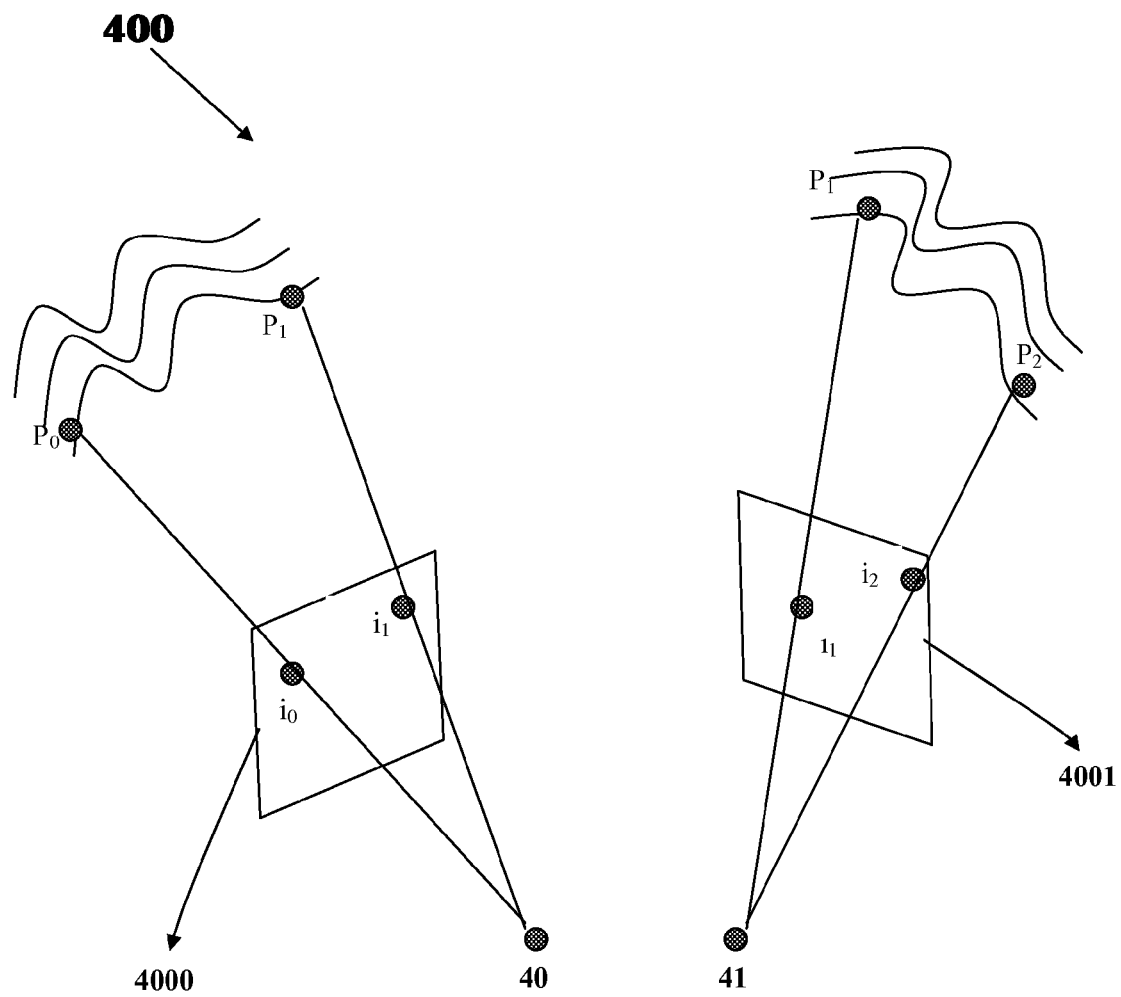
FIG. 4 illustrates schematically a G-BANK: an aligned bank of images storing images together with their ground to image transformation.

In a G-BANK, for every image in the bank, the additional data includes at least an image to ground transformation $G_i$. Reference is further made to FIG. 4, which illustrates a G-Bank 400 storing a set of images together with the associated ground to image transformations 4000 and 4001.

As used herein, the term "Ground Coordinate Extraction of an Anchored A-BANK" (GCEAAB) refers to any procedure computing the ground coordinates Pi of every point $Q_i$ in any image in A-BANK, including the ground coordinates of every point in the most recently stored image when the number of images in the bank is incremented. A typical GCEAAB algorithm requires performance of a preliminary procedure of Ground Anchoring of A-BANK defined hereafter.

As used herein, the term "Ground Anchoring of A-BANK" (GAAB) refers to any procedure that enables a GCEAAB algorithm further to compute the ground coordinates of every point in any image in an A-BANK, including the ground coordinates of every point in the most recently stored image when the number of images in the bank is incremented.

An example of a typical implementation of GAAB and GCEAAB algorithms is now presented. In this example, it is assumed that all of the images in the bank were taken from a fixed camera location and the absolute transformation of each image in the bank was computed (A-BANK).

The GAAB procedure starts with the user providing ground coordinates of several points in images in the bank as a list L of pairs of points, $$L = \{(P_1, Q_1, I_1), (P_2, Q_2, I_2), \ldots, (P_n, Q_n, I_n)\}$$

where $Q_i$ is a point in image $I_i$ in the bank, and $P_i$ is the corresponding ground coordinate. Next, a modified list L' is created such that $$L' = \{(P_1, Q_1', I_1), (P_2, Q_2', I_2), \ldots, (P_n, Q_n', I_n)\}$$

where $Q_i' = A^{-1}_i \cdot Q_i$, $A^{-1}_i$ is the inverse absolute transformation of the image $I_i$ and $Q_i'$ is the corresponding location of $Q_i$ on the fixed predefined reference image defined for the bank.

Using L' computed by GAAB, The GCEAAB can be used to computes $P_x$=GCEAAB($Q_x$, $I_x$) where $P_x$ is the ground coordinates of any point $Q_x$ in any image $I_x$.

A typical implementation of a GCEAAB algorithm comprises the following steps:
  a. Obtain a point $Q_x$ in image $I_x$.
  b. Calculate $Q_x' = A_x^{-1} \cdot Q_x$.
  c. Create a new list B, containing at least five elements from the list L' having the smallest distance to $Q_x'$, e.g. the smallest value of $\|Q_i' - Q_x'\|$.
  d. Using GISA, compute the ground to image transformation G'=GISA(C, B), where C is the camera ground coordinates, such that $Q_i' = G'(P_i)$.
  e. Using GIA, compute the ground coordinate $P_x$ of the image point $Q_x$ such that $P_x = GIA(G', Q_x')$.

Figure 12:
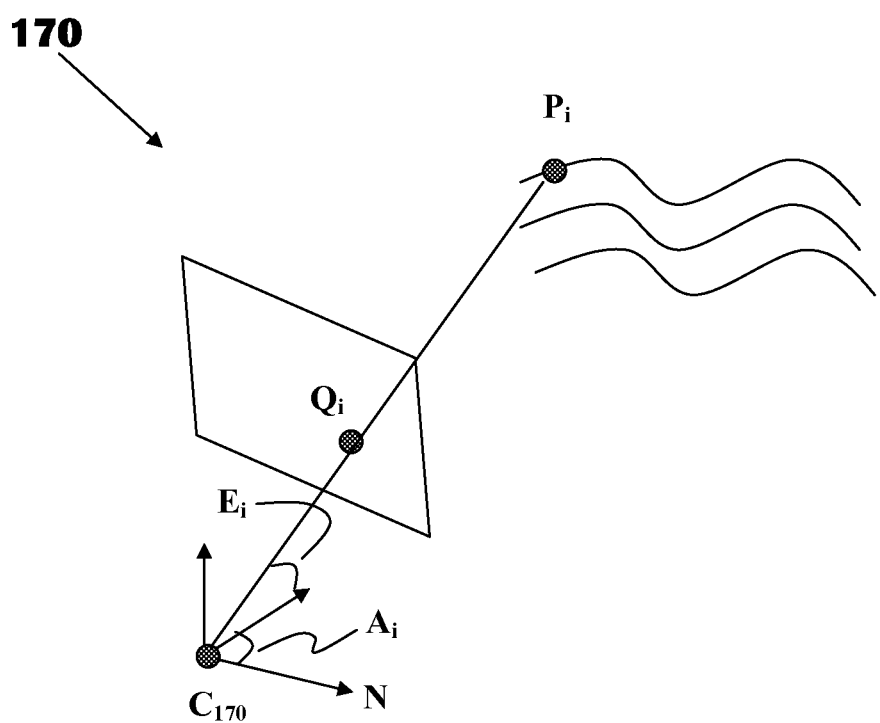
FIG. 12 illustrates schematically computation of the azimuth and elevation of a point for the process of ground anchoring of image bank.

Reference is now made to FIG. 12, illustrating another implementation of GCEAAB comprising images taken from a fixed known camera location. The Cartesian ground coordinates $P_i$ (relative to true north, indicated in the illustration by the vector N) are transformed to $A_i E_i$, the azimuth and elevation angles of the line connecting the camera to the ground point with coordinates $P_i$. List L is then transformed to $L' = \{(Q_1', AE_1), (Q_2', AE_2), \ldots\}$. The connection between $Q_i'$ and $A_i E_i$ is modeled as $A_i E_i = M \times Q_i'$, where M is a 2×2 matrix. Solving for M requires at least two pairs of points. More points can be used in the solution to reduce the error, however. In a typical implementation, the two points in the image for which ground coordinates are already known that are closest (in the image) to the point for which the ground coordinates are being calculated are used. Thereafter, M can be used to compute the azimuth and elevation of the line connecting the camera to the ground location of every point in any stored image.

The AE coordinates thus derived are not the true ground coordinates. The preferred way to convert AE coordinates to ground coordinates is to use a DEM. Reference is now made to FIG. 11, illustrating the use of a DEM 160 to convert AE coordinates to true ground coordinates. A line of sight L from the position of the imaging device $P_1$ to the image point P is computed and the intersection of the line of sight with the ground is computed using the DEM.

The above implementation of ground anchoring of an A-Bank is "manual" in the sense that the operator provides the initial list of coordinates. An automatic ground anchoring procedure for a set of images taken from a known fixed camera location is now described. This automatic ground anchoring procedure involves the matching of several images from the bank to an already anchored photo (usually an ortho-photo) using an IGA. In a typical implementation of an automatic ground anchoring procedure, the list L defined above, is created automatically, instead of manually, using the IGA algorithm assuming the camera position and the approximate camera orientation for each image are known.

The following procedure is then used:
  a. Create an empty list L.
  b. For every image $I_i$ in the bank, use the IGA compute the ground to image transform $G_i$ using the known camera position.
  c. If the IGA succeeded, select five points $Q_1, \ldots Q_5$ in the image $I_i$ (one point can be the image center and the other four point can be vertices of a rectangle with a pre-defined size around the center), and compute the corresponding ground coordinates $P_1 \ldots P_5$ using the GIA, such that $P_j = GIA(G_i, Q_j)$.
  d. Add the elements $\{P_1, Q_1, I_1\} \ldots \{P_5, Q_5, I_5\}$ to the list L.
  e. Repeat steps b-d until all the images in the bank have been processed.

As used herein, the term "Computing ground to image transformation of image in anchored A-BANK" refers to any procedure for computing the ground to image transformation $G_i$ of any image in the bank. A typical implementation of this procedure comprises the following steps:
  a. Select 5 image points (e.g. the four image vertices and the center).
  b. Compute the ground coordinates of the 5 points using GCEAAB.
  c. Compute $G_i$ using the GISA using the said 5 points and the camera location.

Figure 2:
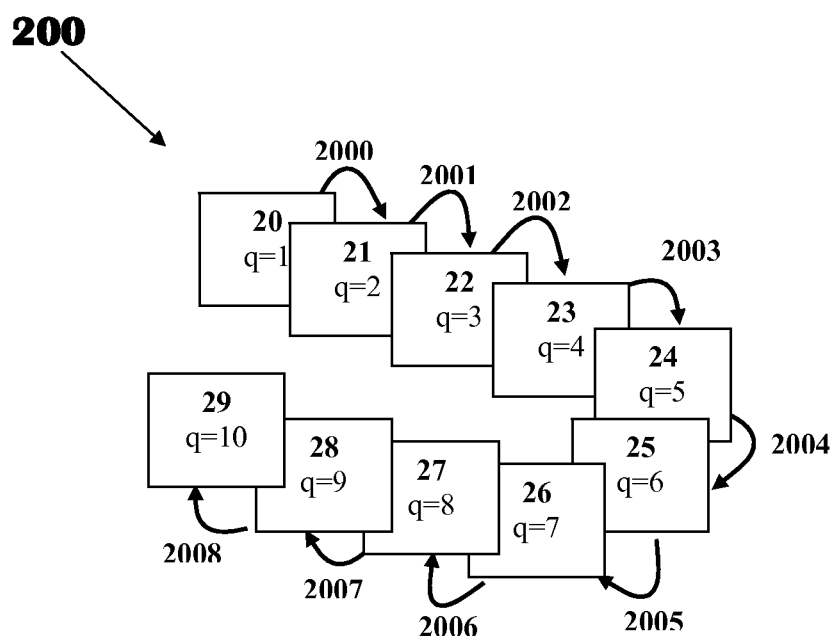
FIG. 2 illustrates schematically a case of large accumulated matching errors between the first and the last image in an A-BANK.
Figure 5:
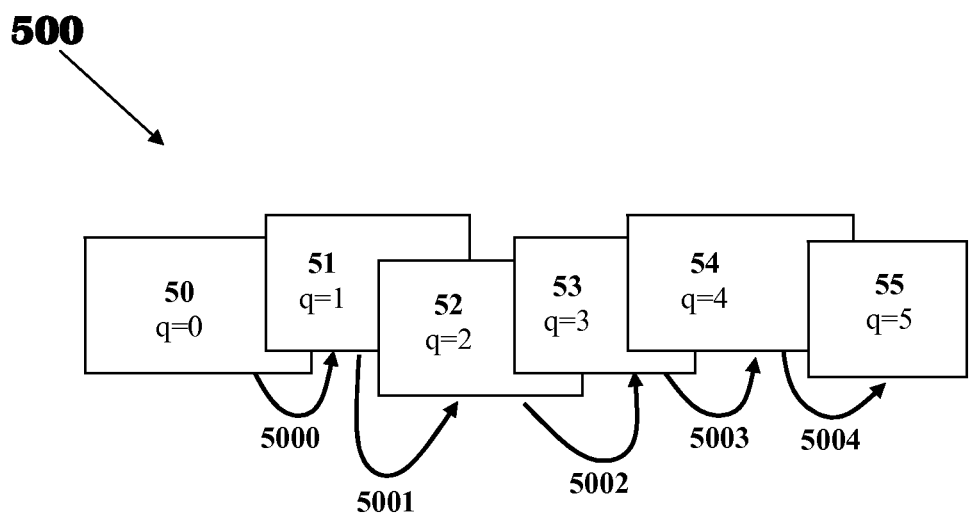
FIG. 5 illustrates schematically a case of large accumulated matching errors in a G-BANK inducing inaccurate ground to image transformation of certain images.

As used herein, the term "quality value of a transformation" refers to a factor $q_i$ about an absolute transformation $A_i$ or ground to image transformation $G_i$ attached to an image $I_i$. Since each of these transformations can be derived from a chain of image matching operations, each of which has limited accuracy, the total error will be proportional to the length of the chain. The quality value $q_i$ is thus a relative measure of this total absolute error. $q_i = 0$ represents the highest possible confidence; increasing values of $q_i$ represent lower confidence as the expected error increases. Reference is now made to FIG. 2, which illustrates schematically several images 20 through 29 in A-Bank 200 with the quality value (q) of their associated absolute transformation 2000-2008. Reference is further made to FIG. 5, which illustrates schematically G-Bank 500 comprising images 50 through 55 and the associated quality values of the corresponding image to ground transformations 5000 through 5004.

As used herein, the term "iterative self-correction" refers to a procedure for reducing cumulative errors in image transformations (i.e., reducing the quality values of transformed images) caused by the limited accuracy of the image to image matching algorithm. Iterative self-correction is performed as new images are added to the bank: corrections are made sequentially in the bank of images, improving the accuracy of the transformations of images already in the bank.

As used herein, the term "object detection algorithm" (ODA) refers to any algorithm for object detection. In order to detect an object, ODA requires at least:
  1. a base image $I_x$ for object detection;
  2. a list of reference images $L = \{(I_0, T_{0X}), (I_1, T_{1X}), \ldots (I_N, T_{NX})\}$, $N \geq 1$, where $I_0 \ldots I_N$ are N images overlapping $I_x$, where $T_{0X} \ldots T_{NX}$ are the images' relative transformation to the image $I_x$; and
  3. a list $R = \{(R_0, P_0), \ldots (R_M, P_M)\}$, $M \geq 0$, where $R_0 \ldots R_M$ is a list of M regions on the image $I_x$, each with a set of parameters $P_i$ defining the parameters for detection in the region $R_i$.

The algorithm detects objects on the images according to the parameter list and returns $O = ODA(I_x, L, R)$ where $O = \{O_0, \ldots O_N\}$ is a list of the detected objects and $O_i$ is a vector of attributes of the object i including at least the target location on the base image $I_x$ and optionally other attributes such as object size, velocity and type.

Figure 13:
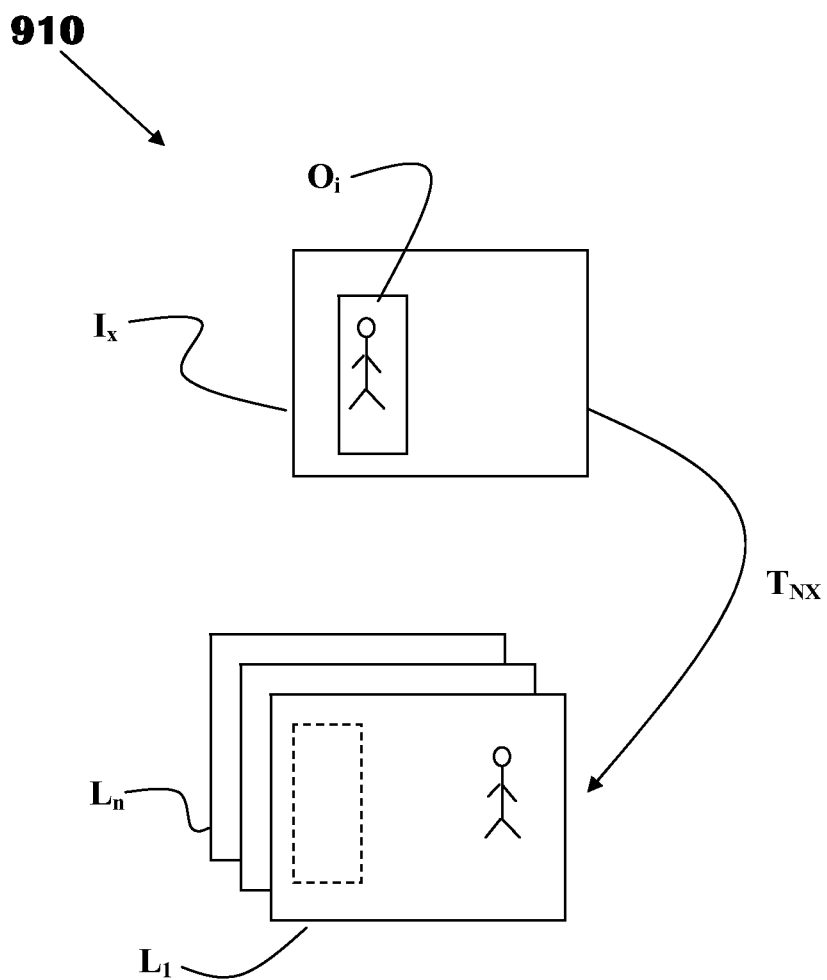
FIG. 13 illustrates schematically an object detection algorithm detecting objects on a base image relative to a set of reference images overlapping the base image.
Figure 14:
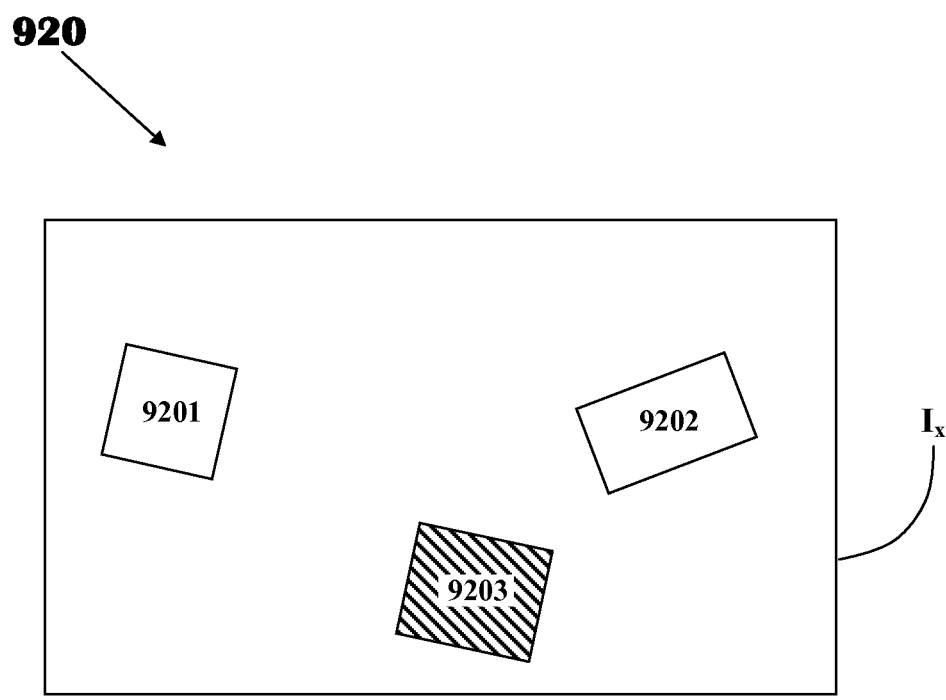
FIG. 14 illustrates schematically regions of detection parameters defined on the base image for object detection.

Reference is now made to FIG. 13, which illustrates an object detection algorithm 910 detecting objects $O_i$ on a base image $I_x$ relative to a set of reference images $L_1$-$L_n$ overlapping the base image, and to FIG. 14, which illustrates regions of detection parameters defined on the base image 920 for object detection. For example, region 9201 may be a region of high sensitivity; region 9202 one of low sensitivity; and region 9203 excluded altogether from detection.

There are many ODAs known in the prior art. One family is based on shape detection and hence can only work for one type of image. Many other ODAs are known in the art that are based on measurement of changes between the base image and the reference images. These ODAs require the presence of overlapping images as a reference as wells as the relative transformation between each reference image and the base image $I_x$. Motion detection algorithms are a well known family of this kind of ODA.

In the invention disclosed herein, an ODA typically implemented is a motion detection algorithm that uses a base image $I_x$, a sequence L of reference images, and the associated relative transformations of the images in the sequence to $I_x$. In addition, the algorithm uses a list R of regions defined as polygons within the base image. Associated with each region is a set of detection parameters that include the ranges of the object's size, speed, and contrast.

This ODA thus can provide, within a single list R, some regions with very sensitive detection limits while others are set to exclude any possibility of object detection within their borders. The ODA returns a list O of detected moving objects. List O includes the position on the base image of each object detected. Optionally, the list can contain the speed and size of each detected object as well.

With these definitions in hand, we proceed to the detailed description of the invention and its embodiments.

As will be demonstrated in detail below, one important difference between the invention herein disclosed and those known in the prior art is the use of iterative self-correction in the construction of the aligned bank of images. Two versions of the iterative self-correction procedure are here described. The first is adapted for reducing errors in the absolute transformations of images in an A-Bank. The second version is for reducing errors in the ground to image transformations of images in a G-Bank.

Figure 3:
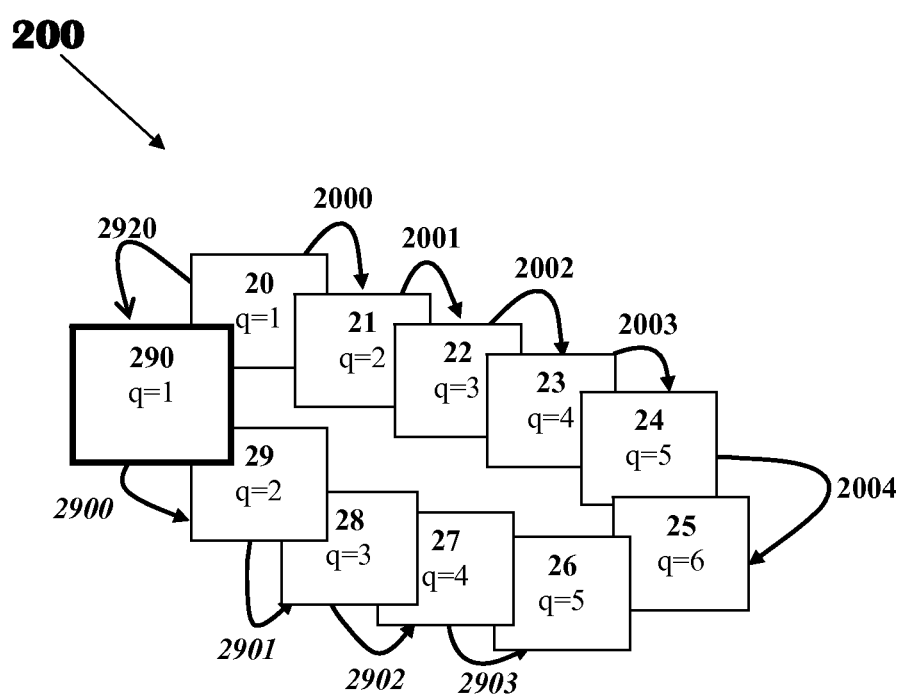
FIG. 3 illustrates schematically the use of the iterative self correction procedure disclosed herein to reduce errors in an A-BANK for the case illustrated in FIG. 2.

Reference is now made to FIGS. 2 and 3. FIG. 2 shows a typical A-Bank 200 comprising images 20-29, and the accumulation of errors in the absolute transformation (as shown by the increase in q) as new images are added to the bank via the corresponding absolute transformations 2000-2008. FIG. 3 illustrates the result of an iterative self-correction procedure (absolute transformations 2900-2903) performed on the A-Bank of FIG. 2 upon addition of a new image 290 to the A-BANK.

A preferred embodiment of iterative self-correction as applied to creation of an aligned image bank with iterative self-correction is now described in detail. This embodiment is of an A-BANK created by images captured from an image sequence source whose images were taken from a fixed position, that is, the only motions that the imaging device can undergo are rotation around any or all of the x, y, and z axes and/or changing zoom.

In this embodiment, the A-BANK is created and the images obtained by the imaging device are added to the bank according to a method described in detail below. A mosaic display of the images collected in the bank can be created from the images in the bank. The procedure for ground anchoring the A-BANK can be performed at any time, and the ground coordinates of any point in any image stored in the bank or of any point on the mosaic view can be computed by GCEAAB. Specifically, the ground coordinates of points within the last stored image can be computed. This way, a video anchoring system is provided, as every successive image (e.g. video frame) is anchored to the ground and ground coordinates of points in the last image can be computed.

In this embodiment, the method for creating the bank comprises the following steps:

1. Obtaining an image sequence source (ISS). The images can originate, e.g., from a camera observing a landscape, the camera being mounted on a pedestal enabling rotation the camera with two or three degrees of freedom (pan/tilt/yaw). The camera can have a zoom control for zooming in and out. Optionally, the camera can report the approximate values for the zoom and the pan/tilt/yaw angles, improving the performance of the whole system.
2. Creating a bank able to store images with additional data. For every image $I_i$ in the bank, the additional data includes: (a) absolute transformation $A_i$; (b) quality value $q_i$ of the transformation; (c) the index of a second image $I_j$ ($j \neq i$) used for computation of $A_i$; and (d) image matching transformation $T_{j,i}$ between the second image $I_j$ and the current image. The retrieval capacities of the bank minimally comprise: (a) given an image $I_n$ with an absolute transformation $A_n$, it can retrieve all the images in the bank that can be matches to the image $I_n$ using the image matching algorithm (IM); (b) given an area defined as an absolute transformation $A_{area}$ and a preferred zoom factor Z, it can retrieve the minimum number of images needed to cover the defined area, preferring images with zoom factor as close to Z as possible.
3. Capturing the first digital image $I_0$ and storing it in the bank. The additional information for this image will be $A_i$=I (i.e. the unit transformation); $q_i$=0; and $j_i$=0. This image is thus the predefined fixed image for the absolute transformations associated with the images to be added to the bank.
4. Capturing a new digital image $I_n$ from the ISS and, by using the image matching algorithm IM, computing the relative transformation $T_{n-1,n}$=IM($I_{n-1}$, $I_n$) between the previously captured digital image $I_{n-1}$ and the new digital image.
5. Computing the approximate absolute transformation $A'_n$ by combining said relative transformation $T_{n-1,n}$ with said absolute transformation $A'_{n-1}$ such that $A'_n = T_{n-1,n} \cdot A_{n-1}$.
6. Retrieving from the bank a list L=ISA($I_n$, $A_n$) of images by that can be used by the image matching algorithm to make a successful match to the image $I_n$. This retrieval is done by using the image selection algorithm (ISA).
7. From the list L, selecting the database image $I_m$ having the best quality value (i.e., the lowest value of $q_m$).
8. Using the image matching algorithm to compute the relative transformation $T_{m,n}$ between the selected database image $I_m$ and the new digital image $I_n$.
9. Computing the final image transformation $A_n$ for the new video frame $I_n$, where $A_n = T_{m,n} \cdot A_m$.
10. Setting the quality value of the new digital image $I_n$ to $q_n = q_m + 1$.
11. Storing the new digital image $I_n$ along with its additional data, namely, absolute transformation=$A_n$; quality value=$q_n$; selected database image index=m.
12. Computing $q_{min}$ and $q_{max}$, which are the minimum and maximum quality value of the images in the list L. The condition $q_{max} - q_{min} > S$, where S is a predetermined threshold, indicates a situation where accumulated matching errors can cause a significant matching error around the new digital image I. The situation is described in FIG. 4. In this case, the iterative self-correction procedure for an A-Bank is used.
13. For each new image from the image sequence, repeat the method starting at step 4.

This method thus creates a self-updating and self-correcting image bank, where every image contains the appropriate absolute transformation, i.e. all information needed to display the bank as a mosaic, in which the accumulated errors are kept small. The sequence of steps outlined above can be run an indefinite number of times, until every new image desired has been added to the bank. To end the sequence, a "stop" command is provided, either from within the software or by the user. In this context, a "stop" command need not necessarily be a software command; it includes the possibility of the user ending data collection by such physical means as turning off the CSDI or by detaching it from the data analysis software.

In an additional embodiment of the invention herein disclosed, the following procedure is used to create a mosaic view of the bank:
1. Defining the area to be displayed. The area can be defined as an absolute transformation $A_{display}$.
2. Defining the optimal zoom factor Z of the images to be used.
3. Retrieving the optimal images from the bank overlapping the transformation $A_{display}$ with preferred zoom factor Z. There can be many images covering the same area; each one has a different zoom factor. In this case, those images having a zoom factor close to the optimal zoom should be preferred.
4. For each of the retrieved images $I_i$, create a warped image $I'_i$ using the absolute transformation $A_i$ such that every point $Q_i$ in $I_i$ will be transformed to $Q'_i = A^{-1}_i \cdot Q_i$
5. Display all warped images $I'_i$.

The method disclosed herein includes the iterative self-correction procedure for an A-BANK to be used when the following conditions hold:
 a. A possible large accumulated error (as defined below) in the absolute transformation $A_i$ of images in the bank has been detected.
 b. The absolute transformation $A_n$ computed for the newly stored image can be used to reduce said errors.

One indication of such a situation is when the newly stored image has at least two overlapping images with large differences in their quality values.

A preferred embodiment of the iterative self-correction procedure for an A-Bank is now described. The procedure comprises the following steps:
1. Given the newly stored image $I_m$ with its absolute transformation $A_m$ and quality value $q_m$, the ISA is used to retrieve from the bank a list $E=ISA(I_m, A_m)$ of images that can be used by the image matching algorithm (IM) to match the image $I_m$.
2. For every image $I_i$ in the list E having a quality factor $q_i > q_m + 1$:
 a. Using the IM algorithm, compute the relative transformation $T_{m,i} = IM(I_m, I_i)$ between the newly stored image $I_m$ and the image $I_i$.
 b. Compute an absolute transformation of the image $I_i$ using the image $I_m$ such that $A'_i = T_{m,i} \cdot A_m$.
 c. Set $j_{old} = j_i$ which is the neighboring image used for the computation of the old absolute transformation $A_i$.
 d. Store the following new data for the image $I_i$:

$A_i = A'_i$ $j_i = m$ $q_i = q_m + 1$ e. Set m=i and i=$j_{old}$ and repeat the procedure from step 2 if $q_i > q_m + 1$.

Figure 15:
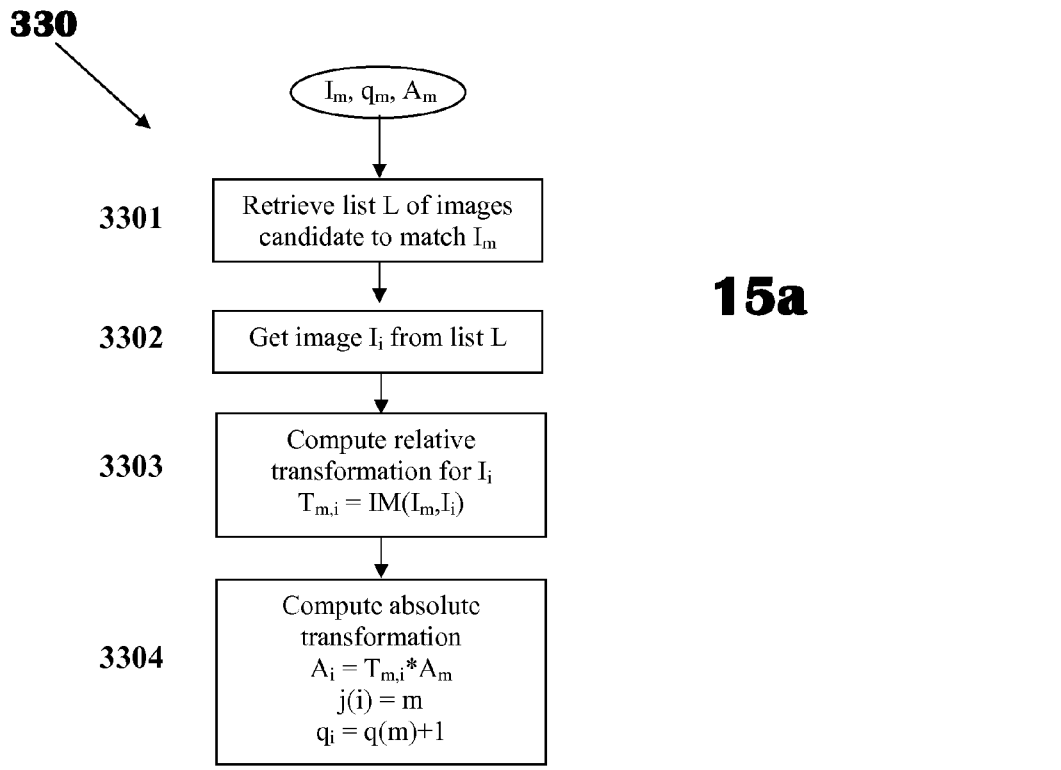
FIG. 15 comprises a flowchart and schematic illustrations describing one step of the self correction procedure for an A-BANK.
Figure 15:
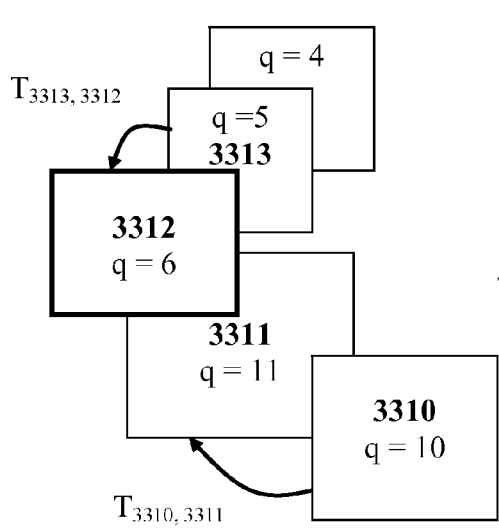
Figure 15:
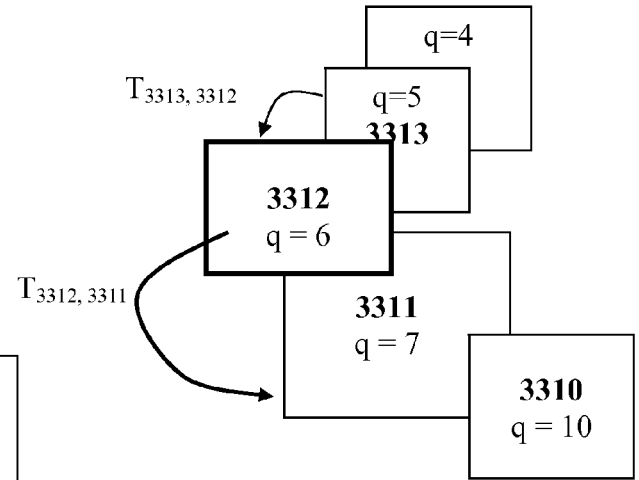

Reference is now made to FIG. 15, which illustrates one iteration of the iterative self-correction procedure. A flow chart of the procedure (beginning with arbitrary I, q, and A, shown as $I_m$, $q_m$, and $A_m$ respectively) is shown in FIG. 15a. As shown in FIG. 15b, before the self-correction step, image 3311 was matched to image 3310 having a quality factor q=11 and an absolute transformation $A_{3311} = T_{3310,3311} \cdot A_{3310}$. When a new image 3312 is added to the bank, it is matched to image 3313, giving it a quality factor $q_{12} = 6$ and an absolute transformation $A_{3312} = T_{3313,3312} \cdot A_{3313}$. The self-correction procedure is then performed. After one iteration of the procedure, image 3311 is matched to 3312, which improves its quality factor q from 11 to 8 (=$q_{3312}+1$) (FIG. 15c) and gives it an absolute transformation $A_{3311} = T_{3312,3311} \cdot A_{3312}$.

Thus, after the completion of the whole self-correction procedure, the newly calculated transformation $A_i$ of the processed chain of images $I_i$ will always have a smaller quality factor $q_i$, indicating an improvement of the overall accuracy of the alignment of the images in the bank.

Reference is now made to FIGS. 2 and 3 showing an example of the effect of the self-correction procedure. FIG. 2 illustrates a typical A-Bank 200 comprising images 20-29 where each image is matched to its predecessor (2000-2008); the accumulation of matching errors is shown by the increase in q. Specifically, the error between image 20 and 29 is unacceptably large. FIG. 3 illustrates schematically a newly added image 290, overlapping image 20 and 29, which initializes the self-correction procedure. Image 290 is matched to image 20 via transformation 2920. After the procedure, the matching transformation of images 26-29 is changed to 2901-2903 respectively and as shown, the quality value q of images 26-29 is reduced, indicating an overall improvement in the accuracy of the A-BANK.

In one embodiment of the present invention, a manual version of GAAB is used. The procedure involves providing the coordinates of the position of the fixed camera and the ground coordinates of several points in images in the bank. According to this embodiment, a list L is created manually with the entries containing an index m of an image $I_m$, a point $Q_i$ in the image $I_m$ and the ground coordinates $P_i$ of that point. The list is transferred to the manual version of the ground anchoring of A-Bank algorithm. Thereafter, the GCEAAB algorithm is used to compute the ground coordinate of every point in any stored image.

In an additional embodiment of the present invention, automatic GAAB is used. The automatic version of the ground anchoring of A-Bank algorithm is used. Thereafter, GCEAAB algorithm can be used to compute the ground coordinate of every point in any stored image.

The GAAB procedure described herein can be performed any time. Once the procedure is finished, images added afterwards will not require repetition of the procedure. Obtaining the ground coordinates of point in these newly added images is possible as well using GCEAAB. Specifically, the ground coordinates of points on the last stored image can be computed. This way, a video anchoring system is achieved, since every video frame is added to the bank and the ground coordinates of points on the last video frame can be computed. In an alternative embodiment of the invention herein disclosed, in order to increase anchoring accuracy, some points from the newly covered area are added to the list L. This embodiment is particularly useful if a large new area was covered after the initial performance of the GAAB procedure.

In an additional embodiment of the method herein disclosed, the mosaic display of the bank is combined with ground anchoring, a powerful orientation tool for the user. This combination gives the user the option to view the mosaic of a predefined area and to get the ground coordinates of any point of interest on the mosaic. When a user selects a point $Q_m$ in the mosaic display, an image $I_i$ containing the selected point is found and the corresponding point $Q_i$ on the said image $I_i$ is computed. The GCEAAB is then used to compute the ground coordinates $P_m$ of the selected mosaic point $Q_m$ such that $P_m = GCEAAB(Q_i, I_i)$.

An additional embodiment of the invention herein disclosed includes object detection for image stream source originating from a rotating and zooming camera. Given any ODA, object detection is performed on the A-BANK as follows:
1. Choose a number N of regions. (N≥0)
2. Define a list R' of N polygonal regions with associated detection parameters according to the method described in detail below.
3. Select a base image for detection $I_x$ from the bank.
4. Project the list R' onto the base image to get the list R of regions on said image according to the procedure described in detail below.
5. Retrieve from the bank a list $I_0 \ldots I_N$ of reference images overlapping $I_x$ and the associated absolute transformations $A_0 \ldots A_N$.
6. Construct the list L={({$I_0$, $T_0$}, ($I_1$, $T_1$), ... ($I_N$, $T_N$)} of images with their relative transformations $T_i$ to the base image ($T_i = A_i A^{-1}_x$).
7. Use the ODA to obtain a list of detected objects O=ODA ($I_x$, L, R), including the locations of the objects on the base image and the associated additional information.
8. Update the A-BANK with M new images (M=integer≥0).
9. Repeat steps 3-8 until a "stop" command is received.

Alternative embodiments of the invention include the additional steps of computing the ground coordinates of objects in the list following detection of the object if the bank was anchored to ground, and of displaying on a map the ground coordinates of the objects. As with the previous embodiments, the object detection sequence may be run once, or a plurality of times until a "stop" command (either from within the software, via a command from the user, or physically stopping image collection, as defined above) is received, or indefinitely.

There are several options to define the list R of polygonal regions for detection and to project them on the base image:
a) R can be defined on the base image $I_x$.
b) Alternatively, it can be defined on other images within the bank. In this case, the regions are projected onto $R_x$ as follows: assuming that $R_y = (V_0 \ldots V_N)$ is a polygon with N vertices defined on the image $I_y$ having an absolute transformation $A_y$. The projected polygon $R_x$ on image $I_x$ is then given by $R_x = A_x A_y^{-1} R_y$.
c) R can be defined on the mosaic view of the bank. In this case the regions are projected onto $I_x$ according to the following procedure: assuming that $R_M = \{V_0 \ldots V_N\}$ is a polygon with N vertices defined on the mosaic, the projected polygon is given by $R_x = A_x R_M$.
d) If the bank was anchored to ground with GAAB, R can be defined according to ground coordinates. In this case the regions are projected to $I_x$ according to the following procedure: assuming that $R_M = \{V_0 \ldots V_N\}$ is a polygon with N vertices defined as ground coordinates, the ground to image transformation $G_x$ of $I_x$ is computed using the "computing ground to image transformation of image in an anchored A-BANK" procedure, and the projected polygon is thus $R_x = G_x(R_M)$.

Regions can be predefined once with any of the methods in the list. Thereafter, object detection can be performed on any image with the predefined regions in effect. Continuous object detection on a video sequence can be performed by adding the images from the video sequence to the bank (step 8 above) and performing steps 3-7 above when the selected base image in step 3 is set as the image most recently captured from the video sequence.

In the special case in which the ODA is based on moving object detection, there should be some additional consideration given to choosing the list of reference images to use.

Usually, in order to detect fast-moving objects, the time interval between the images in the list L of reference images should be short, while in contrast, to detect slow objects, the time interval between the said images should be long. The reference images should thus be selected accordingly.

An embodiment of the aligned image bank with self-correction technique herein disclosed in which a geographically anchored aligned image bank is created from an image sequence source in which the imaging device is moving is now described. This embodiment of the invention is suitable, e.g., for an image sequence source in which the images are taken from cameras mounted on a vehicle, airborne platform, or handheld.

In this embodiment, a G-BANK type of image bank is created. The G-BANK stores the images along with their ground to image transformation G as shown in FIG. 4. Each new image is transferred to an IGA and the ground to image transformation G is computed. If the IGA fails to produce an acceptable G, G is approximated by matching the new image to other images already in the bank. With a G-BANK, there is no need to perform the anchoring procedure as was necessary in the case of an A-BANK, because the G-BANK is created and incremented while already anchored to ground.

When the newly obtained image is successfully matched to ground by the IGA or when it overlaps more than one image, an iterative self-correction procedure for the G-BANK is used to reduce the errors of the ground to image transformation of some images already in the bank. This special technique ensures a low rate of matching errors in the bank.

In contrast to embodiments involving creation and use of an A-BANK, the G-BANK is anchored to ground from its creation. Images are not added to the bank until the first image is anchored. Since the method disclosed herein retains all of the original images and all of their associated information, images for which a successful match was not made can be set aside and added to the bank at any later time at which a successful match can be made. Another option is to add the images with an approximate image to ground transformation from any external source if given.

Thus, in many cases, using a G-BANK is superior to using an A-BANK, since for a G-BANK, there is no need to perform an anchoring procedure and embodiments in which a G-BANK is used are suitable for moving cameras. On the other hand, an A-BANK can be created and incremented without using an IGA. IGAs usually require a DEM, which is not always available, and as demonstrated above, an A-BANK can be anchored to ground at any time should such anchoring be necessary.

A mosaic view from any viewpoint can be created from the images in the bank. The desired viewpoint of the mosaic is defined as a view matrix V. The ground coordinates of any point in any stored image or any point on the mosaic view can be computed. Specifically, the ground coordinates of points on the most recently stored image can be computed. This way, a video anchoring system for a moving camera is achieved as every video frame is anchored to the ground and ground coordinates of any point on he last video frame can be computed.

The embodiment for G-BANK disclosed herein is based on the IGA. The automatic IGA is not expected to succeed in all cases. Hence, the method described herein is especially adapted to overcome the possibility of IGA failure.

A typical IGA requires approximate values for the zoom factor, pan/tilt/yaw angles, and the ground position of the camera. As the accuracy of these values increases, the success rate of the IGA increases as well as the overall performance of the method.

Nevertheless, if the level of performance of an automatic IGA is not acceptable, then a manual version of the IGA can be used to anchor some of the images in the bank and the method will still function.

For simplicity, it is assumed that images will not be stored in the bank until the first image is anchored successfully to the ground by the IGA; if necessary, however, this constraint can be removed by keeping the images in a temporary storage location and adding them to the bank at some time after the first image is anchored to the ground or adding the images as they are arriving using an approximate image to ground transformation from any external source if given.

One preferred embodiment of the aligned image bank with self-correction method based on a G-BANK and usable when the image source is moving comprises the steps of:

1. Obtaining an image sequences source (ISS). The images can originate from a CSDI on a fixed or moving installation, enabling the camera to observe a landscape.
2. Creating a database capable of storing images and their associated additional data. For every image $I_n$ in the bank, the additional data includes:
   a. the image to ground transformation $G_i$;
   b. the ground coordinates of the camera;
   c. the quality value $q_i$ about the value of $G_i$. If $G_i$ is computed directly by the IGA, $q_i=0$; if $q_i$ is computed by a chain of image matching with length n, $q_i=n$; and
   d. the index of a neighboring image $j_i$ used for the computation of $G_i$ and the image matching transformation $T_{i,m}$ between the current image and the neighboring image $m=j_i$.

The image bank has the following retrieval capacities:
a. Given an image $I_n$ with ground to image transformation $G_n$, it can retrieve all the images in the bank that can be matched to the image $I_n$ using the image matching algorithm (IM);
b. Given a ground area defined as a polygon, and a preferred zoom factor Z, it can retrieve the minimum number of images needed for covering the defined ground area, preferring images with zoom factor as close to Z as possible.

2. Capturing a new image $I_n$ from the image source and getting the approximate values for the camera position and the zoom and pan/tilt/yaw values.
3. The image and the approximate values for camera position, zoom and camera angles are fed to the IGA. The IGA attempts to anchor the image and to compute the ground to image transformation $G_n$ for the image $I_n$.
4. If no image was successfully matched by the IGA, new images are captured until the IGA succeeds for the first time.
5. If the IGA succeeds, the image $I_n$ is added to the bank with the additional data: $G_n$, $q_n=0$, $j_i=-1$.
6. If the IGA fails,
   i. Using the IM algorithm, the relative transformation $T_{n-1,n}$ between the previously captured digital image $I_{n-1}$ and the new digital image $I_n$ is computed.
   ii. The approximate image to ground transformation $G_n'$ is calculated by combining the relative transformation $T_{n-1,n}$ with the ground to image transformation $G_{n-1}$ such that $G_n'=T_{n-1,n} \cdot G_{n-1}$.
   iii. By using the image selection algorithm, the list $L=ISA(I_n, G_n')$ is created containing all the images in the bank that can be used by the image matching algorithm IM to make a successful match to image $I_n$.
   iv. From the list L, the image $I_m$ having the lowest value of $q_m$ (i.e. the image with the best transformation quality value) is selected.
   v. The image matching algorithm is used to compute the relative transformation $T_{m,n}$ between the selected image $I_m$ and the new digital image $I_n$.
   vi. The final image transformation for the new digital image $I_n$ is computed as $G_n=T_{m,n} \cdot G_m$.
   vii. The quality value of the new digital image $I_n$ is set to $q_n=q_m+1$ and $j_n$ is set to $j_n=m$.
7. Storing the new digital image $I_n$ with its new data, including $G_n$, $q_n$, and the selected image $j_n=m$.
8. Retrieving from the bank a list L of images overlapping the image $I_n$ according to the transformation $G_n$.
9. Adding the new digital image $I_n$ to the list L.
10. Computing $q_{min}$ and $q_{max}$ for the images in the list L.
11. The condition $q_{max}-q_{min}>S$ (S is a predefined number, usually 3) indicates a situation where accumulated matching errors can cause a significant matching error around the new digital image. The situation is described in FIG. 6. In this case, a self-correction procedure is used.
12. For each consecutive new image from the image sequence source, follow the procedure listed, starting from step 3.

As with the previous embodiments, the sequence of steps can be repeated indefinitely until a "stop" command (as defined above) is received.

The method disclosed herein includes the iterative self-correction procedure for to be used for G-BANK when the following conditions hold:
a. A possible large accumulated error (as defined below) in the ground to image transformation $G_i$ of images in the bank has been detected.
b. The absolute transformation $G_n$ computed for the newly stored image can be used to reduce said errors.

A preferred embodiment of the iterative self-correction procedure for use with a G-BANK is now described. The procedure comprises the following steps:
1. Given the newly stored image $I_m$ and using the ISA, a list $L=ISA(I_m, G_m)$ of images that can be successfully matched to the image $I_m$ is built.
2. For every image $I_i$ in the list L having a quality value $q_i>q_m+1$,
   a. The IM is used to compute the relative transformation $T_{m,i}=IM(I_m, I_i)$ between image $I_m$ and image $I_i$.
   b. A new ground to image transformation of the image $I_i$ is calculated using the image $I_m$ such that $G_i'=T_{m,i} \cdot G_m$.
   c. Set $j_{old}=j_i$ which is the neighboring image used for the computation of the old $G_i$.
   d. The following new data is stored for image $I_i$: $G_i=G_i'$; $j_i=m$; $q_i=q_m+1$.
   e. Set $m=i$ and $i=j_{old}$.
   f. If $q_i>q_m+1$, then repeat the procedure from step b.

Figure 16:
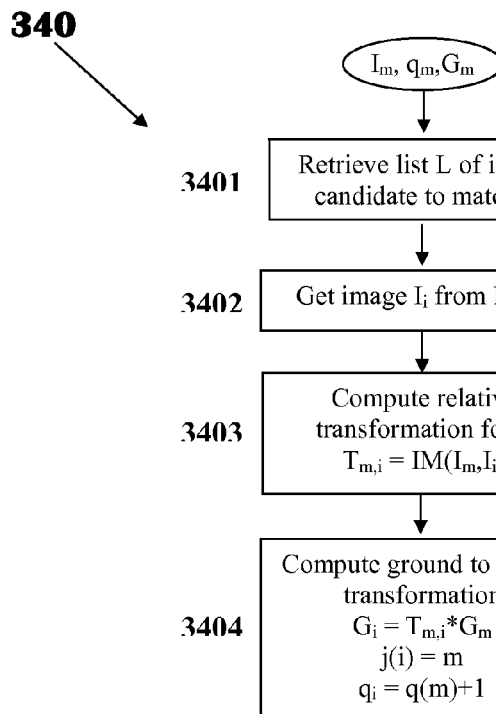
FIG. 16 comprises a flowchart and schematic illustrations describing one step of the self-correction procedure for a G-BANK.
Figure 16:
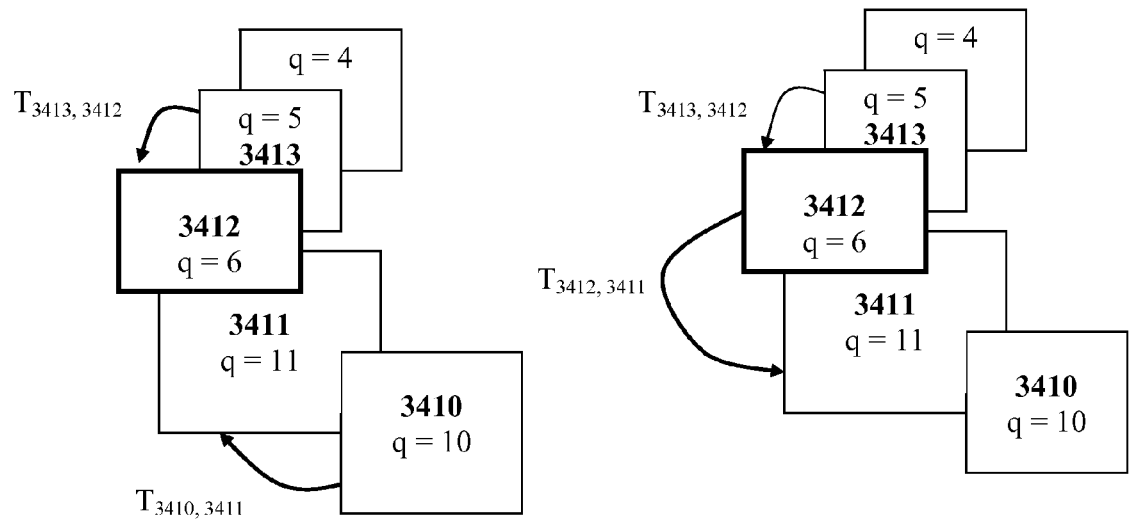

Reference is now made to FIG. 16, which provides a schematic illustration of one iteration of the self-correction procedure 340. FIG. 16a illustrates a flow chart of the procedure beginning from arbitrary $I_m$, $q_m$, and $G_m$. As shown in FIG. 16b, before the self-correction step, image 3411 was matched to image 3410, having a quality value $q_{11}=11$ and a ground to image transformation $G_{11}=T_{10,11} \cdot G_{10}$. A new image 3412 is added to the bank and matched to image 3413 thus having a quality value $q_{12}=7$ and an ground to image transformation $G_{12}=T_{3413,3412} \cdot G_{3413}$. The self-correction procedure is then performed. After one iteration of the procedure (FIG. 16c), image 3411 is matched to 3412 which improves its quality value $q_{11}$ from 11 to 8 and gives it a ground to image transformation $G_{3411}=T_{3412,3411} \cdot G_{3412}$. At the conclusion of this procedure, the newly computed transformation $G_i$ of the processed chain of images $I_i$ will always have a smaller (i.e.

better) quality value $q_i$, indicating an improvement of the overall accuracy of the alignment of the images in the bank.

Figure 6:
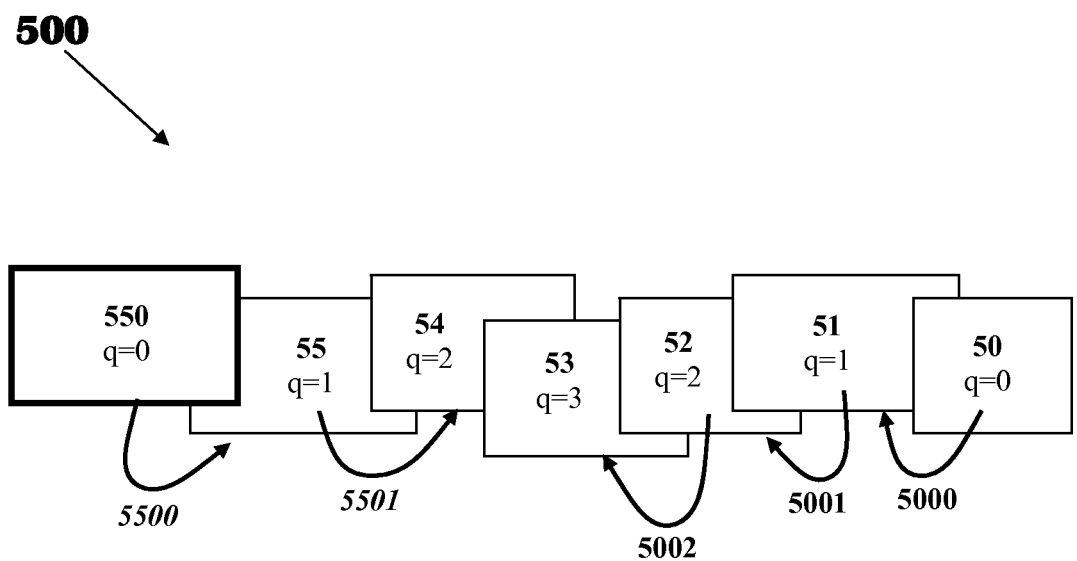
FIG. 6 illustrates schematically the use of the iterative self correction procedure disclosed herein to reduce errors in a G-BANK for the case illustrated in FIG. 5.

Reference is now made to FIGS. 5 and 6 showing an example of the effect of the self correction procedure used for a G_BANK. FIG. 5 illustrates a situation with large accumulated errors. Image 50 was successfully anchored to ground with an IGA having q=0. Images 51-55 were not successfully matched to ground by the IGA and therefore each was matched to its predecessor (5000-5004) to approximate their G. The quality factor q of these images increases: image 55, for example, has a quality value q=5. A new image 550 is obtained and is successfully anchored to ground with the IGA, which therefore gives it a quality value q=0 as shown in FIG. 6. The overlapping image 55 has a quality value q=5, therefore, the self-correction procedure is activated, reducing the quality factors of the images 54 and 55. The effect of the self-correction procedure with the new matching order (5500-5501) is shown schematically in FIG. 6.

For creation of a mosaic view of the bank as described above, a method comprising the following steps is disclosed:
1. The ground area to be displayed is defined as a polygon of ground coordinates.
2. The optimal zoom factor Z is defined for the images to be used to construct the mosaic.
3. The desired viewpoint of the mosaic is defined as a view matrix V.
4. The optimal list L of images from the bank overlapping the ground area to be displayed with preferred zoom factor Z is retrieved. Note that there can be many images covering the same area, each one having a different zoom factor. In this case, the images having a zoom factor close to the optimal zoom should be used.
5. For each of the retrieved images $I_i$ in the list L having a ground to image transformation $G_i$, create a virtual view image $I_i'$ according to the view matrix V, using the VVE.
6. Display all of the virtual view images $I_i'$.

The ground coordinates $P_i$ of any point $Q_i$ on any image $I_x$ in the bank can be obtained. The preferred way to obtain them is by using the GIA such that $P_i$=GIA($Q_i$, $G_x$), where $G_x$ is the ground to image transformation of the image $I_x$.

Specifically, the ground coordinates of any point on the last stored image can be computed. This way, a video anchoring system is achieved, as every video frame is added to the bank and the ground coordinates of points on the last video frame can be computed.

Alternatively, a point $Q_v$ can be selected in the mosaic view of the G-BANK and the ground coordinates $P_v$ of the point can be computed as follows: an image $I_i$ containing the selected point $Q_v$ is found and the corresponding point $Q_i$ on the said image $I_i$ is computed. The ground coordinates are then computed using a GIA such that: $P_v$=GIA($Q_i$, $G_i$), where $G_i$ is the ground to image transformation of the image $I_i$.

In a further embodiment of the invention herein disclosed, using the above method for creating an anchored aligned bank of images using a G-Bank, and given any ODA, a method for object detection for a moving camera is disclosed, comprising the following steps:
1. Choose a number N of desired regions (N≥0).
2. Define a list R' of N polygonal regions with associated detection parameters according to the method described in detail below.
3. Select the base image for detection $I_x$ from the bank.
4. Project the list R' onto the base image to get the list R of regions on said image according to the procedure described in detail below.
5. Retrieve from the bank a list $I_0 \ldots I_N$ of reference images overlapping $I_x$ and the associated ground to image transformation $G_i$.
6. Construct the list L={($I_0$, $T_0$), ($I_1$, $T_1$), . . . ($I_N$, $T_N$)} of images with their relative transformations $T_i$ to the base image, $T_i$=RTC($G_i$, $G_x$).
7. Use the ODA to obtain a list of detected objects O=ODA ($I_x$, L, R) including their location on the base image and the additional available information.
8. Update the G-BANK with M new images (M=integer≥0).
9. Repeat steps 3-8 until a "stop" command is received.

In additional embodiments of the invention, the object detection method includes the additional steps of computing the ground coordinates of objects in the list O, and/or displaying the ground coordinates of the objects on a map or on any mosaic view of the bank.

The list R of polygonal regions of detection parameters is defined according to one of the region detection methods listed here and is projected on the base image $I_x$.
a) R is defined relative to the base image $I_x$ used for object detection.
b) R is defined relative to other images in the bank. In this case the regions are projected onto $I_x$ according to the following procedure: assuming that $R_t$=($V_0 \ldots V_N$) is a polygon with N vertices defined on the image $I_y$ having an absolute transformation $A_y$, then the projected polygon on image $I_x$ is $R_x$=RTC($G_x$, $G_y$).
c) R is defined on the mosaic view of the bank with image to ground transformation $G_y$. In this case the regions are projected onto $I_x$ according to the following procedure: assuming that $R_M$=($V_0 \ldots V_N$) is a polygon with N vertices defined on the mosaic, then the projected polygon is $R_x$=RTC($G_x$, $G_y$).
d) R is defined relative to ground coordinates. In this case the regions are projected onto $I_x$ according to the following procedure: assuming that $R_M$={$V_0 \ldots V_N$} is a polygon with N vertices defined on the mosaic, then the projected polygon is $R_x$=$G_x \cdot R_m$.

As in the case of a G-BANK, regions can be predefined once with any of the methods in the list. Thereafter, object detection can be performed on any image with the predefined regions in effect. Furthermore, continuous object detection on a video sequence can be performed by adding the images from the video sequence to the bank and performing steps 3-7 above where the selected base image in step 3 is set as the most recently captured image from the video sequence.

The various embodiments of the methods disclosed above are easily incorporated into a system designed for producing an aligned bank of images by using an iterative self-correction procedure. It is within the scope of the present invention to disclose such a system. Such a system comprises any type of CSDI as defined above; means for producing an ISS from the images captured by said CSDI; and the software necessary for enabling said ISS to produce an aligned bank of images according to any of the embodiments of the method disclosed above. A preferred embodiment of the system incorporates software adapted to run the method according to the preferred embodiment of the method for a sequence of images obtained from a fixed location. A second embodiment of the system incorporates software adapted to run the method according to the preferred embodiment for a sequence of images obtained from a moving CSDI (i.e. a sequence of images obtained from a plurality of locations).

What is claimed is:
1. A non-transitory computer-readable storage medium with an executable program for real-time video-to-ground anchoring of video sequence by updating a geographically anchored bank of images for each newly received image from an image sequence source said program comprising the steps of:
- a. obtaining an image sequence source (ISS) comprising images are taken from a plurality of locations;
- b. creating a bank adapted for
  - (i) storage of images; and
  - (ii) storage of additional data for each image in said bank, said additional data comprising at least
  - (i) a ground to image transformation adapted to transform three-dimensional coordinates to corresponding image coordinates; and
  - (ii) the quality value of said transformation;
- c. capturing a new image I.sub.0 from said ISS;
- d. attempting to calculate a ground to image transformation by applying an image to ground anchoring algorithm to said new image I.sub.0;
- e. repeating steps (c) and (d) until a ground to image transformation has been calculated successfully;
- f. adding said new image I.sub.0 and the computed ground to image transformation of I.sub.0 and a quality value to said bank;
- g. capturing a new image I.sub.n from said ISS;
- h. attempting to calculate a ground to image transformation by applying an image to ground anchoring algorithm to said new image I.sub.n;
- i. calculating a ground to image transformation if said ground to image transformation is not known for new image I.sub.n by matching said new image I.sub.n to at least one overlapping image already in said bank;
- j. adding said new image I.sub.n and the computed ground to image transformation of I.sub.n and a quality value to said bank;
- k. performing an iterative self-correction procedure, thereby improving the quality value of the transformations of said images in said set, said procedure comprising the step of altering said ground to image transformation of a set of images within said bank if at least one of the following conditions is met:
  - (i) said new image overlaps at least two previously captured video frames within said bank,
  - (ii) a ground to image transformation of said new image was successfully computed by said image to ground anchoring algorithm; and,
- l. repeating steps (g)-(k) until a "stop" command is received;

wherein said step of performing an iterative self-correction procedure for producing said geographically anchored back of images from said ISS comprising images captured from a plurality of locations such that a ground to image transformation of an image most recently stored in said ISS device is computed, allowing real-time online video-to-ground anchoring of each newly received video image.

2. The method of claim 1, wherein said method further comprises the additional step of extracting the geographic coordinates of a point in any image in said bank by applying a ground intersection algorithm (GIA).

3. The method of claim 1, wherein said method further comprises the additional step of creating a virtual view of the observed landscape from any point of view desired by the operator by applying a virtual view engine to images stored in the bank and the ground to image transformation of said images after changes being made to the image bank by newly received video image or execution of the self-correction procedures.

4. The method of claim 3, wherein said method further comprises the additional steps of
- a. selecting a point from any image in said bank in said virtual view; and,
- b. calculating the ground coordinates of said point by applying a GIA;

wherein said method uses said geographically anchored bank of images to extract the geographic coordinates of any selected point in said virtual view.

5. The method of claim 1, wherein said method further comprises the additional steps of
- a. obtaining an ISS adapted for producing a temporal sequence of images;
- b. updating the aligned bank of images with new images from said ISS; and,
- c. calculating the ground coordinates of any point in the most recently inserted image by applying a GIA algorithm.

6. The method of claim 1, wherein said method further comprises the additional steps of
- a. choosing a number N of regions (N=integer≥0);
- b. defining said N regions with respect to a data set chosen from the group consisting of (i) a set of images within said bank, (ii) said virtual view of said bank and (iii) ground coordinates;
- c. defining a set of detection parameters for each of said N regions;
- d. selecting a base image for object detection from said bank;
- e. projecting said list of regions on said base image by using a predetermined algorithm;
- f. retrieving from said bank a list of reference images overlapping said base image;
- g. applying the ground to image transformation of said base image and said reference images, thereby computing a relative transformation between each of said reference images and said base image;
- h. applying an object detection algorithm to said base image, said list of regions, said list of reference images, said relative transformations and said detection parameters, thereby obtaining a list of detected objects;
- i. updating the said bank with M new images (M=integer≥0); and,
- j. repeating steps (d)-(i) until a "stop" command is received;

wherein said method uses said geographically aligned bank of images to detect an object.

* * * * *